(12) United States Patent
Fukami et al.

(10) Patent No.: US 11,736,338 B2
(45) Date of Patent: Aug. 22, 2023

(54) NETWORK MANAGEMENT APPARATUS, METHOD, AND PROGRAM

(71) Applicant: NIPPON TELEGRAPH AND TELEPHONE CORPORATION, Tokyo (JP)

(72) Inventors: Kimihiko Fukami, Musashino (JP); Masataka Sato, Musashino (JP); Kenichi Tayama, Musashino (JP); Kenji Murase, Musashino (JP); Shingo Horiuchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 134 days.

(21) Appl. No.: 17/285,390

(22) PCT Filed: Oct. 17, 2019

(86) PCT No.: PCT/JP2019/040978
§ 371 (c)(1),
(2) Date: Jan. 24, 2022

(87) PCT Pub. No.: WO2020/080492
PCT Pub. Date: Apr. 23, 2020

(65) Prior Publication Data
US 2022/0224591 A1 Jul. 14, 2022

(30) Foreign Application Priority Data
Oct. 18, 2018 (JP) .................................. 2018-196853

(51) Int. Cl.
*H04L 41/0631* (2022.01)
*H04L 41/0677* (2022.01)

(52) U.S. Cl.
CPC ...... *H04L 41/0631* (2013.01); *H04L 41/0677* (2013.01)

(58) Field of Classification Search
CPC ............. H04L 41/0631; H04L 41/0677; H04L 41/0618; H04L 41/0893
(Continued)

(56) References Cited

U.S. PATENT DOCUMENTS 9,632,861 B1 * 4/2017 Watanabe ........... G06F 11/0778
10,223,145 B1 * 3/2019 Neogy ................ G06F 11/3006
(Continued)

FOREIGN PATENT DOCUMENTS

EP       1246435 A1 * 10/2002 ........... H04L 41/065
JP       201878523 A       5/2018
(Continued)

OTHER PUBLICATIONS

Kimihiko Fukami et al., A Study on Method of Visualization for Multiple Network Structure, IEICE Technical Report, 2018.
(Continued)

*Primary Examiner* — Melvin H Pollack
(74) *Attorney, Agent, or Firm* — Harness, Dickey & Pierce, P.L.C.

(57) ABSTRACT

A network management apparatus according to an embodiment includes: a storage unit configured to store information indicating a correspondence relationship between information objects related to a physical layer and information objects related to a logical layer in a network configuration, an acquisition unit configured to acquire a first information object related to a location where a failure occurs in the physical layer of the network configuration from the storage unit, an identification unit configured to identify, as a failure influence range, a second information object associated with the first information object related to the location where the
(Continued)

failure occurs, of the information objects related to the logical layer stored in the storage unit, the first information object being acquired by the acquisition unit, and an outputting unit configured to output information indicating the failure influence range identified by the identification unit.

8 Claims, 43 Drawing Sheets

(58) Field of Classification Search
USPC .......................................................... 709/224
See application file for complete search history.

(56) References Cited

U.S. PATENT DOCUMENTS

| | | | |
|---|---|---|---|
| 10,264,003 B1* | 4/2019 | Wu ..................... | H04L 43/08 |
| 10,305,758 B1* | 5/2019 | Bhide ................. | G06F 11/3466 |
| 10,505,825 B1* | 12/2019 | Bettaiah ............... | G06F 40/174 |
| 2009/0109841 A1* | 4/2009 | Nozaki ................. | H04L 45/00 |
| | | | 370/218 |
| 2011/0302199 A1* | 12/2011 | Wada ................... | G06F 16/20 |
| | | | 707/769 |
| 2014/0149169 A1* | 5/2014 | Nakano ............... | G06F 11/3419 |
| | | | 705/7.22 |
| 2014/0355453 A1* | 12/2014 | Zhang ................ | B01D 19/0404 |
| | | | 370/242 |
| 2015/0133151 A1* | 5/2015 | Jung .................... | H04W 24/02 |
| | | | 455/456.1 |
| 2015/0236895 A1* | 8/2015 | Kay ..................... | H04L 67/535 |
| | | | 709/224 |
| 2015/0244599 A1* | 8/2015 | Nagai .................... | H04L 67/10 |
| | | | 709/223 |
| 2015/0249587 A1* | 9/2015 | Kozat .................. | H04L 43/20 |
| | | | 370/236 |
| 2015/0295808 A1* | 10/2015 | O'Malley ............. | H04L 43/10 |
| | | | 709/224 |
| 2016/0014073 A1* | 1/2016 | Reddy .................. | H04L 43/16 |
| | | | 713/2 |
| 2016/0043797 A1* | 2/2016 | Sareen ..................... | H04J 3/14 |
| | | | 398/5 |
| 2016/0087832 A1* | 3/2016 | Wilson .................... | H04L 1/24 |
| | | | 370/242 |
| 2016/0112262 A1* | 4/2016 | Johnson ................ | G06F 9/4411 |
| | | | 709/221 |
| 2016/0119192 A1* | 4/2016 | Tanoue .................. | H04L 41/12 |
| | | | 715/735 |
| 2016/0254968 A1* | 9/2016 | Ebtekar .................. | H04L 41/12 |
| | | | 709/223 |
| 2016/0262038 A1* | 9/2016 | Dunn .................. | H04L 41/0893 |
| 2018/0032388 A1* | 2/2018 | Saito ................... | G06F 11/0766 |
| 2018/0091401 A1* | 3/2018 | Richards ............. | H04L 43/0817 |
| 2018/0159745 A1* | 6/2018 | Byers ..................... | G06F 9/455 |
| 2018/0196708 A1* | 7/2018 | Amano ................ | G06F 11/079 |
| 2018/0331856 A1* | 11/2018 | Kulkarni ................ | H04L 43/55 |
| 2018/0332442 A1* | 11/2018 | Shaw .................... | H04W 36/26 |
| 2018/0343227 A1* | 11/2018 | Arango ................ | H04L 45/586 |
| 2018/0351782 A1* | 12/2018 | Tammana ............. | H04L 41/069 |
| 2018/0367412 A1* | 12/2018 | Sethi ....................... | H04L 41/40 |
| 2020/0036575 A1* | 1/2020 | Palavalli ............. | G06F 11/1484 |
| 2020/0189731 A1* | 6/2020 | Mistry ................. | H04B 7/18502 |
| 2022/0078096 A1* | 3/2022 | Stump .................. | H04L 43/065 |

FOREIGN PATENT DOCUMENTS

| | | | | |
|---|---|---|---|---|
| WO | WO-2011056952 A2 * | 5/2011 | ........... | H04L 12/403 |
| WO | WO-2016114776 A1 * | 7/2016 | ............. | H04B 3/487 |

OTHER PUBLICATIONS

Akihiro Koizumi and Youji Ozawa, Network innovation that contributes to the expansion of social innovation, Hitachi critique, vol. 91, No. 11, 2009, pp. 22-25.

Kazuaki Akashi et al., Proposal of Resource Mapping Method for Network Service Creation, IEICE Technical Report, vol. 116, No. 324, 2016, pp. 43-48.

Kimihiko Fukami et al., Study on Method of Identifying Service Influence Occurred by Network Fault, IEICE Technical Report, vol. 118, 2019, pp. 13-18.

* cited by examiner

| LAYER TYPE | ENTITY NAME | MEANING | CORRESPONDENCE RELATIONSHIP |
|---|---|---|---|
| PHYSICAL | PS (Physical Structure) | FACILITY SUCH AS BUILDING, MANHOLE, AND THE LIKE | DEVICE OBJECT |
| | PD (Physical Device) | DEVICE | DEVICE OBJECT |
| | PP (Physical Port) | COMMUNICATION PORT INCLUDED IN DEVICE | PORT OBJECT |
| | AS (Aggregate Section) | CABLE | MEDIUM OBJECT |
| | PL (Physical Link) | CORE WIRE OF CABLE | MEDIUM OBJECT |
| | PC (Physical Connector) | CONNECTOR FOR CONNECTING CABLE | MEDIUM OBJECT |
| LOGICAL | TL (Topological Link) | CONNECTIVITY BETWEEN DEVICES (WITHIN LOGICAL DEVICE LAYER) | LINE OBJECT |
| | NFD (Network Forwarding Domain) | TRANSFERABLE RANGE WITHIN DEVICES (WITHIN LOGICAL DEVICE LAYER) | LINE OR SURFACE OBJECT |
| | TPE (Termination Point Encapsulation) | TERMINATION POINT OF COMMUNICATION | POINT OBJECT |
| | NC (Network Connection) | END-END CONNECTIVITY FORMED BY LC AND XC (WITHIN COMMUNICATION LAYER) | COMMUNICATION OBJECT |
| | LC (Link Connect) | CONNECTIVITY BETWEEN DEVICES (WITHIN COMMUNICATION LAYER) | LINE OR SURFACE OBJECT |
| | XC (Cross(X) Connect) | CONNECTIVITY IN DEVICE (WITHIN COMMUNICATION LAYER) | LINE OR SURFACE OBJECT |

Fig. 1

| PS | |
|---|---|
| ATTRIBUTE NAME | TYPE |
| STATE | String (SUBMERGING, POWER DEPLETION, COLLAPSE) |
| COORDINATE | INTEGER ARRAY WITH TWO-DIMENSIONAL COORDINATE |
| DEVICE OBJECT ARRAY | ARRAY IN WHICH DEVICE OBJECT (PD) IS STORED |

Fig. 4

| PD | |
|---|---|
| ATTRIBUTE NAME | TYPE |
| STATE | Boolean |
| COORDINATE | INTEGER ARRAY WITH TWO-DIMENSIONAL COORDINATE |
| PORT OBJECT | ARRAY IN WHICH PORT OBJECT (PP) IS STORED |

Fig. 5

| PP | |
|---|---|
| ATTRIBUTE NAME | TYPE |
| STATE | Boolean |
| COORDINATE | INTEGER ARRAY WITH TWO-DIMENSIONAL COORDINATE |

Fig. 6

| AS | |
|---|---|
| ATTRIBUTE NAME | TYPE |
| STATE | String (CONNECTION, CUTTING, CORROSION) |
| MEDIUM OBJECT ARRAY | ARRAY IN WHICH MEDIUM OBJECT (PL) IS STORED |

Fig. 7

| PL | |
|---|---|
| ATTRIBUTE NAME | TYPE |
| STATE | Boolean (CONNECTION, CUTTING) |
| CONNECTOR OBJECT ARRAY | ARRAY IN WHICH CONNECTOR OBJECT (PC) IS STORED |

Fig. 8

| PC | |
|---|---|
| ATTRIBUTE NAME | TYPE |
| STATE | Boolean (CONNECTION, COMING OFF) |
| PORT OBJECT | ARRAY IN WHICH PORT OBJECT (PP) IS STORED |

Fig. 9

| TL,NFD,LC,XC | |
|---|---|
| ATTRIBUTE NAME | TYPE |
| POINT OBJECT ARRAY | TPE (POINT OBJECT) ARRAY CONSTITUTING TL, NFD, LC, AND XC |
| STATE | Boolean |

Fig. 10

| TPE | |
|---|---|
| ATTRIBUTE NAME | TYPE |
| LOWER OBJECT | POINT OBJECT (TPE) CORRESPONDING TO LOWER LAYER |
| PORT OBJECT ARRAY | ARRAY IN WHICH PORT OBJECT (PP) IS STORED |
| COORDINATE | INTEGER ARRAY WITH TWO-DIMENSIONAL COORDINATE |
| STATE | Boolean |

Fig. 11

| NC | |
|---|---|
| ATTRIBUTE NAME | TYPE |
| POINT OBJECT ARRAY | ALL TPE (POINT OBJECT) ARRAY BETWEEN STARTING POINT AND END POINT OF COMMUNICATION |
| STATE | Boolean |
| INFORMATION OF SERVICE SUBSCRIBER | STRING ARRAY OR URL |

Fig. 12

| LAYER TYPE | SPEC NAME | MEANING |
|---|---|---|
| PHYSICAL | PS Spec (Physical Structure Specification) | DEFINE UNIQUE ATTRIBUTE FOR EACH PS |
| | PD Spec (Physical Device Specification) | DEFINE UNIQUE ATTRIBUTE FOR EACH PD |
| | PP Spec (Physical Port Specification) | DEFINE UNIQUE ATTRIBUTE FOR EACH PP |
| | AS Spec (Aggregate Section Specification) | DEFINE UNIQUE ATTRIBUTE FOR EACH AS |
| | PL Spec (Physical Link Specification) | DEFINE UNIQUE ATTRIBUTE FOR EACH PL |
| | PC Spec (Physical Connector Specification) | DEFINE UNIQUE ATTRIBUTE FOR EACH PC |

Fig. 35

| LAYER TYPE | SPEC NAME | MEANING |
|---|---|---|
| PHYSICAL | TL Spec (Topological Link Specification) | DEFINE UNIQUE ATTRIBUTE FOR EACH TL |
| | NFD Spec (Network Forwarding Domain Specification) | DEFINE UNIQUE ATTRIBUTE FOR EACH NFD |
| | TPE Spec (Termination Point Encapsulation Specification) | DEFINE UNIQUE ATTRIBUTE FOR EACH TPE |
| | NC Spec (Network Connection Specification) | DEFINE UNIQUE ATTRIBUTE FOR EACH NC |
| | LC Spec (Link Connect Specification) | DEFINE UNIQUE ATTRIBUTE FOR EACH LC |
| | XC Spec (Cross(X) Connect Specification) | DEFINE UNIQUE ATTRIBUTE FOR EACH XC |

Fig. 36

| SPECIFICATION TABLE | |
|---|---|
| COLUMN NAME | TYPE |
| name | String |
| valueFrom | int |
| valueTo | int |
| type | String |

Fig. 38

| ENTITY TABLE | |
|---|---|
| COLUMN NAME | TYPE |
| CharacteristicName | String |
| value | String |

Fig. 39

NETWORK MANAGEMENT APPARATUS, METHOD, AND PROGRAM

CROSS-REFERENCE TO RELATED APPLICATIONS

This application is a 371 U.S. National Phase of International Application No. PCT/JP2019/040978 filed on Oct. 17, 2019, which claims priority to Japanese Application No. 2018-196853 filed on Oct. 18, 2018. The entire disclosures of the above applications are incorporated herein by reference.

TECHNICAL FIELD

Embodiments of the present invention relate to a network management apparatus, method, and program.

BACKGROUND ART

There is a technology that registers, in a specification database, one or more pieces of specification information including properties of an NW to be managed (communication network) from data in which specification information specifying properties of the NW is defined in a data model format, and generates an information object representing management information of the NW based on information object generation instruction including information to be associated with the properties included in the specification information and values each designated for one or more items related to the information (see, e.g., PTL1).
The information object includes a value designated for each item included in the information object generation instruction in a case where the information object matches a format of a corresponding property of the specification information of the specification database.

There is also a technology that displays an image corresponding to the configuration described above on a display device in a common manner regardless of change of an NW device type and a protocol when maintaining physical and logical layer configuration of an NW implemented by a plurality of NW devices and performing display on the display device (see, e.g., Non Patent Literature 1).

CITATION LIST

Patent Literature

PTL1: JP 2018-78523 A

Non Patent Literature

Non Patent Literature 1: Kimihiko Fukami, Masataka Sato, Kenichi Tayama, and Shingo Horiuchi, "A Study on Method of Visualization for Multiple Network Structure", IEICE Technical Report, ICM2017-80 (2018 March)

SUMMARY OF THE INVENTION

Technical Problem

However, when a failure (for example, a device failure) occurs in an NW, the technology described in Non Patent Literature 1 cannot identify which location in the NW configuration (physical or logical layer) is affected by a failure location in the NW. Thus, the influence range of the failure cannot be displayed on a display device as the NW configuration, and information of customers affected by the failure cannot be obtained.

The present invention has been made in view of the above circumstances, and an object of the present invention is to provide a network management apparatus, method, and program capable of identifying an influence due to a failure occurring on a communication network.

Means for Solving the Problem

To achieve the above object, a first aspect of a network management apparatus according to an embodiment of the present invention is a network management apparatus including: a storage unit configured to store information indicating a correspondence relationship between information objects related to a physical layer and information objects related to a logical layer in a network configuration; an acquisition unit configured to acquire a first information object related to a location where a failure occurs in the physical layer of the network configuration from the storage unit; an identification unit configured to identify, as a failure influence range, a second information object associated with the first information object related to the location where the failure occurs, of the information objects related to the logical layer stored in the storage unit, the first information object being acquired by the acquisition unit; and an outputting unit configured to output information indicating the failure influence range identified by the identification unit.

A second aspect of the network management apparatus according to an embodiment of the present invention is the network management apparatus according to the first aspect in which the storage unit further stores information about subscribers to a service by the network configuration in association with the information objects related to the logical layer, the identification unit identifies a piece of the information about the subscribers that is associated with the first information object related to the location where the failure occurs as information of a subscriber affected by the failure, the first information object being acquired by the acquisition unit, and the outputting unit outputs the information of the subscriber affected by the failure, which is identified by the identification unit.

A third aspect of the network management apparatus according to an embodiment of the present invention is the network management apparatus according to the first aspect in which the information objects related to the physical layer include a port object indicating a communication port attached to a communication device, the information objects related to the logical layer include a plurality of point objects indicating a generating location or a termination of communication and a line or surface object including a point object of the plurality of point objects, and the correspondence relationship between the information objects related to the physical layer and the information objects related to the logical layer includes a correspondence relationship between the port object and the point object.

A fourth aspect of the network management apparatus according to an embodiment of the present invention is the network management apparatus according to the third aspect in which when the first information object related to the location where the failure occurs, acquired by the acquisition unit, is the port object, the identification unit identifies the port object as a failure influence range in the physical layer and identifies a point object associated with the identified port object and a line or surface object including the point object as a failure influence range in the logical layer.

A fifth aspect of the network management apparatus according to an embodiment of the present invention is the network management apparatus according to the third aspect in which the information objects related to the physical layer include a device object indicating a communication device having the communication port, and the identification unit, when the first information object related to the location where the failure occurs, acquired by the acquisition unit is the device object, is the device object, identifies a communication device indicated by the device object and a port object indicating a communication port included in the communication device as a failure influence range in the physical layer, and identifies a point object associated with the identified port object and a line or surface object including the point object as a failure influence range in the logical layer.

A sixth aspect of the network management apparatus according to an embodiment of the present invention is the network management apparatus according to third aspect in which the information objects related to the physical layer include a medium object indicating a communication cable connectable to the communication port; and the identification unit, when the first information object related to the location where the failure occurs, acquired by the acquisition unit, is the medium object, identifies a communication cable indicated by the medium object and a port object indicating a communication port connectable to the communication cable as a failure influence range in the physical layer, and identifies a point object associated with the identified port object and a line or surface object including the point object as a failure influence range in the logical layer.

An aspect of a network management method performed by a network management apparatus according to an embodiment of the present invention is a network management method including: storing, in a storage unit, information indicating a correspondence relationship between information objects related to a physical layer and information objects related to a logical layer in a network configuration; acquiring a first information object related to a location where a failure occurs in the physical layer in the network configuration from the storage unit; identifying, as a failure influence range, a second information object associated with the acquired first information object related to the location where the failure occurs, among the information objects related to the logical layer stored in the storage unit; and outputting information indicating the identified failure influence range.

An aspect of a non-transitory computer-readable storage medium that stores a network management processing program according to an embodiment of the present invention is a non-transitory computer-readable storage medium that stores a network management processing program for causing a processor to function as each of the units of the network management apparatus described in any one of the first to sixth aspects.

Effects of the Invention

According to the first aspect of a network management apparatus according to an embodiment of the present invention, a second information object on a logical layer associated with a first information object related to a location where a failure occurs in a physical layer in a network configuration is identified as a failure influence range, and thus when a failure occurs in the physical layer, a failure influence range in the logical layer can be appropriately identified.

According to the second aspect of the network management apparatus according to an embodiment of the present invention, a piece of information about subscribers associated with a first information object related to a location where a failure occurs is identified as information of a subscriber affected by the failure, and thus a communication service subscriber affected by the failure can be appropriately identified.

According to the third aspect of the network management apparatus according to an embodiment of the present invention, a correspondence relationship between a port object in the physical layer and a point object in the logical layer defines a correspondence relationship between the physical layer and the logical layer, and thus an influence range by occurrence of the failure can be appropriately identified.

According to the fourth aspect of the network management apparatus according to an embodiment of the present invention, when a location where a failure occurs is a communication port, the port object is identified as a failure influence range in the physical layer, a point object associated with the port object and a line or surface object including the point object are identified as a failure influence range in the logical layer, and thus a failure influence range when the location where the failure occurs is a communication port can be appropriately identified.

According to the fifth aspect of the network management apparatus according to an embodiment of the present invention, when a location where a failure occurs is a communication device, a communication device indicated by the device object, and a port object indicating a communication port included in the communication device are identified as a failure influence range in the physical layer, a point object associated with the port object and a line or surface object including the point object are identified as a failure influence range in the logical layer, and thus a failure influence range when the location where the failure occurs is a device can be appropriately identified.

According to the sixth aspect of the network management apparatus according to an embodiment of the present invention, when a location where a failure occurs is a communication medium, a communication cable indicated by the medium object and a port object indicating a communication port connectable to the communication cable are identified as a failure influence range in the physical layer, a point object associated with the port object and a line or surface object including the point object are identified as an influence range of the failure in the logical layer, and thus a failure influence range when the location where the failure occurs is a communication medium can be appropriately identified.

That is, according to each aspect of the present invention, it is possible to identify an influence caused by a failure generated in a communication network.

BRIEF DESCRIPTION OF DRAWINGS

FIG. 1 is a diagram illustrating, in a tabular form, an example of modeling a network configuration applied to a network management apparatus according to a first embodiment of the present invention.

FIG. 4 is a diagram illustrating, in a tabular form, an example of definition of a PS Entity in a physical layer applied to the network management apparatus according to the first embodiment of the present invention.

FIG. 5 is a diagram illustrating, in a tabular form, an example of definition of a PD Entity in the physical layer applied to the network management apparatus according to the first embodiment of the present invention.

FIG. 6 is a diagram illustrating, in a tabular form, an example of definition of a PP Entity in the physical layer applied to the network management apparatus according to the first embodiment of the present invention.

FIG. 7 is a diagram illustrating, in a tabular form, an example of definition of an AS Entity in the physical layer applied to the network management apparatus according to the first embodiment of the present invention.

FIG. 8 is a diagram illustrating, in a tabular form, an example of definition of a PL Entity in the physical layer applied to the network management apparatus according to the first embodiment of the present invention.

FIG. 9 is a diagram illustrating, in a tabular form, an example of definition of a PC Entity in the physical layer applied to the network management apparatus according to the first embodiment of the present invention.

FIG. 10 is a diagram illustrating, in a tabular format, an example of definition of an LC Entity, an XC Entity, a TL Entity, and an NFD Entity in a logical layer applied to the network management apparatus according to the first embodiment of the present invention.

FIG. 11 is a diagram illustrating, in a tabular form, an example of definition of a TPE Entity in the logical layer applied to the network management apparatus according to the first embodiment of the present invention.

FIG. 12 is a diagram illustrating, in a tabular form, an example of a definition of an NC Entity in the logical layer applied to the network management apparatus according to the first embodiment of the present invention.

FIG. 35 is a diagram illustrating, in a tabular form, an example of Specs (physical layer) of facility information held by the failure influence grasping system according to the sixth embodiment of the present invention.

FIG. 36 is a diagram illustrating, in a tabular form, an example of Specs (logical layer) of facility information held by the failure influence grasping system according to the sixth embodiment of the present invention.

FIG. 38 is a diagram illustrating, in a tabular form, an example of a schema of a Specification table of facility information specified by the failure influence grasping system according to the sixth embodiment of the present invention.

FIG. 39 is a diagram illustrating, in a tabular form, an example of a schema of an Entity table of facility information specified by the failure influence grasping system according to the sixth embodiment of the present invention.

DESCRIPTION OF EMBODIMENTS

Figure 2:
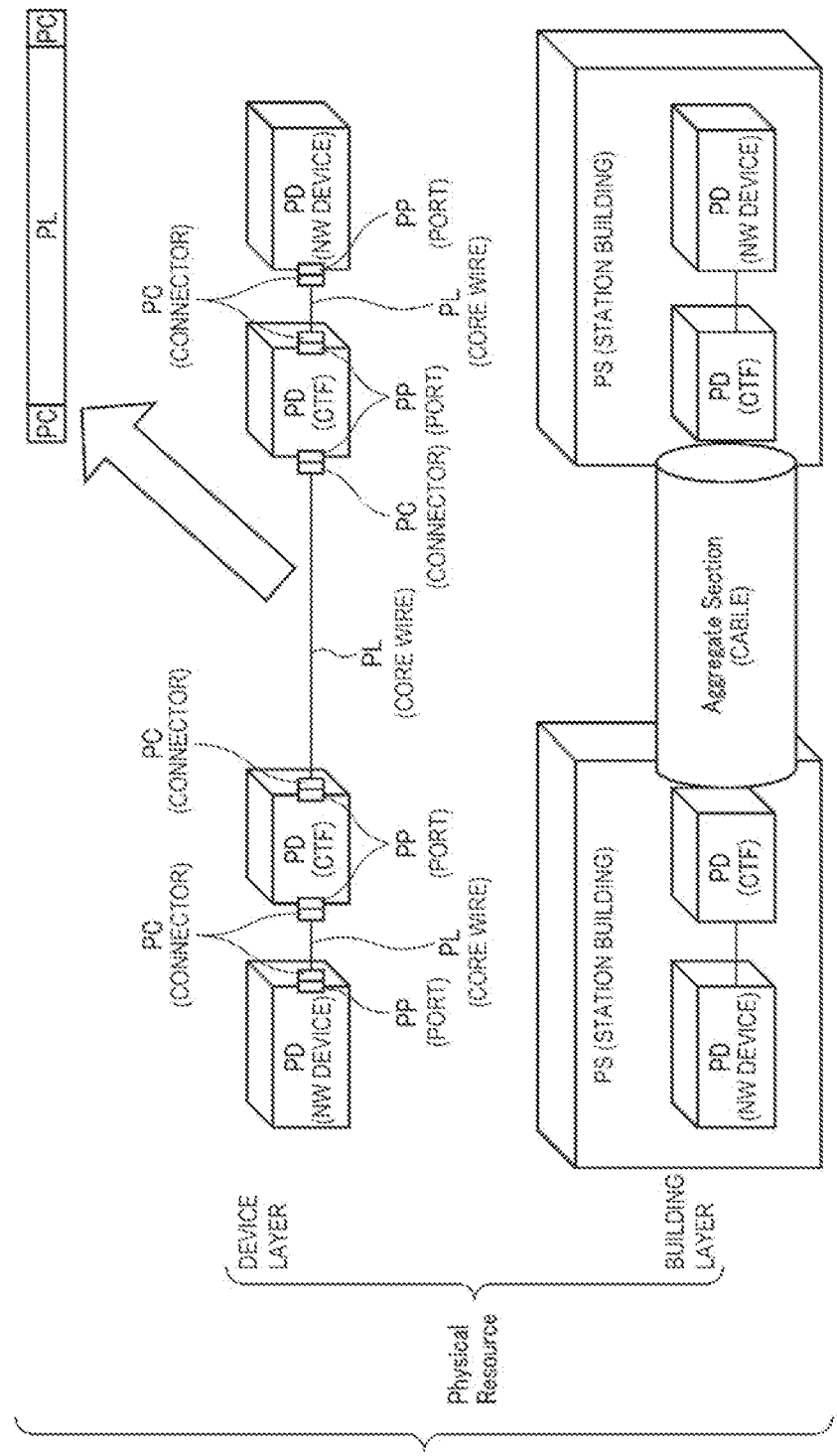
FIG. 2 is a diagram illustrating an application case of physical Entities applied to the network management apparatus according to the first embodiment of the present invention.

Embodiments according to the present invention will be described below with reference to the drawings.

A network management apparatus according to an embodiment of the present invention models each component of a physical layer and a logical layer of a communication network using a unified information object (hereinafter simply referred to as an object).

The network management apparatus also uses connections among objects to identify an influence range of a failure and identify a communication service user that is affected by the failure from user information associated with objects.

In this manner, an influence range of a failure generated in a network including multiple layers having different protocols and medium types and an affected service user are identified.

Next, an outline of a network management apparatus according to an embodiment of the present invention will be described. First, modeling of a NW configuration will be described in the following 1-1 to 1-7.

1-1. The network management apparatus holds an NW device in a physical layer as a device object, holds a communication port in the physical layer as a port object, and holds a communication medium in the physical layer as a medium object.

1-2. The network management apparatus holds a generating location and a termination of communication in a logical layer as point objects, and holds communication between the point objects and a communicable range between the point objects as a line or surface object.

1-3. The logical layer further holds a communication object. The communication object has (1) a point object array in which all point objects between a starting point and an end point on the logical layer are stored, (2) information about service subscribers, and (3) a state.

1-4. The device object and the port object each have a state and a coordinate. The medium object has a state.

1-5. The point objects each have (1) a subobject (a point object corresponding to a lower layer relative to the layer to which the point object belongs), (2) a state, and (3) a coordinate. The line or surface object has a state and a point object array.

The point object array holds a point object name that makes up the line or surface object. The point objects each can not only hold the subobject as described above, but also hold a higher object (a point object corresponding to a higher layer with respect to a layer to which the point object belongs).

1-6. The network management apparatus holds association between the physical layer objects and the logical layer objects. Specifically, a subobject included in a point object holds a port object of a corresponding physical layer.

1-7. The network management apparatus holds association of objects between logical layers. Specifically, a subobject included in each of the point objects holds a point object of a location where a type of a lower layer changes.

Second, identification and display of an influence range (failure due to port failure) will be described in the following 2-1 to 2-7. 2-1 to 2-4 correspond to identification of an influence range. 2-5 to 2-7 correspond to display of an influence range.

2-1. When a failure location is a port, the network management apparatus sets a state of a port object corresponding to the port to be unacceptable indicating occurrence of a failure.

2-2. The network management apparatus sets a state of a point object on the logical layer as an object corresponding to the port object to be unacceptable.

2-3. The network management apparatus identifies an influence range of the point object. Specifically, the network management apparatus sets a state of a point object array constituting a communication object in a higher layer with respect to the physical layer to be unacceptable, the communication object being an object including the point objects described above.

2-4. The network management apparatus repeatedly searches for a point, line (or surface), or a communication object of a layer higher by one tier corresponding to a failure location and corresponding to a point object array constituting the communication object described above, and performs processing of 2-3 as described above to the top layer.

2-5. The network management apparatus displays communication objects and point, line (or surface) objects that constitute all the logical layers on a display device. In addition, when the state of any of the objects is set to be unacceptable, the network management apparatus displays the object in red on the display device.

2-6. The network management apparatus searches for the point objects indicated at 2-4 and subobjects thereof, and displays an image obtained by connecting the objects and the subobjects by dotted lines on the display device.

2-7. The network management apparatus displays a drawing object, which is a graphic indicating a device, a port, and a medium object of the physical layer on a display device. In conjunction with this display, when the state of the port object is set to be unacceptable, the network management apparatus displays the relevant port object in red on the display device.

Third, identification and display of the influence range (device failure) will be described in the following 3-1 to 3-7. 3-1 to 3-4 correspond to identification of an influence range and 3-5 to 3-7 correspond to display of an influence range.

3-1. When a failure location is a device, the network management apparatus sets states of a device object corresponding to the device and a port object included in the device to be unacceptable. When submerging, power depletion, collapse, or the like occurs in a building, or when a failure occurs in the device itself, a device failure occurs.

3-2. The network management apparatus sets a state of a point, line (or surface) object on the logical layer as an object corresponding to the device object to be unacceptable.

3-3. The network management apparatus identifies an influence range of the line (or surface) object. Specifically, the network management apparatus searches for a communication, point, line (or surface) object of a layer higher by one tier as an object including any of elements of the point object array that constitutes the line (or surface) object described in 3-2, and sets the state of the object to be unacceptable.

3-4. The network management apparatus searches for an object of a layer higher by one tier as an object corresponding to the failure location and including any of the communication, point, line (or surface) objects described in 3-3, and repeats the search to the top layer.

3-5. The network management apparatus displays all the communication object, point, line (or surface) objects that constitute the logical layers on the display device. In addition, when the state of any of the objects described above is set to be unacceptable, the network management apparatus displays the relevant object in red on the display device.

3-6. The network management apparatus searches for the point objects described in 3-5 and subobjects thereof, and displays an images obtained by connecting the point objects and the subobjects by dotted lines on the display device.

3-7. The network management apparatus displays drawing objects each of which is a graphic indicating a device, port, or medium object of the physical layer on the display device. In conjunction with this display, when the state of the device object is set to be unacceptable, the network management apparatus displays the corresponding device object in red on the display device.

Fourth, identification and display of an influence range (in the case of a medium failure) will be described in the following 4-1 to 4-6. 4-1 to 4-3 correspond to identification of an influence range and 4-4 to 4-6 correspond to display of an influence range.

4-1. When a failure location is a medium object, the network management apparatus sets a state of a communication medium (including a connector when the connector for connecting the communication medium exists) to be unacceptable.

In addition to this setting, the network management apparatus searches for a port object (corresponding to a communication port connectable to a connector of the communication medium) to be connected to a medium object corresponding to the communication medium, and sets a state of the port object to be unacceptable.

The case where a failure occurs in the medium object is a case where cutting, corrosion, or the like occurs in a cable.

4-2. The network management apparatus sets a state of point objects on each logical layer corresponding to the searched port object to be unacceptable.

4-3. The network management apparatus sets, to be unacceptable, a state of a communication, or line (or surface) object of a higher layer with respect to the physical layer as an object that includes all the point objects described in 4-2.

4-4. The network management apparatus displays all communication object, and point, line (or surface) objects that constitute the logical layer on the display device. In addition, when the state of any of the objects is be unacceptable, the network management apparatus displays the object in red on the display device. The method for searching for an object in the higher layer is implemented by searching for objects in a higher layer as an object that includes point, line (or surface) objects.

4-5. The network management apparatus searches for the objects described in 4-4 and subobjects included in the point objects of these objects, and displays an image obtained by connecting the objects and the subobjects by dotted lines on the display device.

4-6. The network management apparatus displays the device, medium, and port objects of the physical layer on the display device. In conjunction with this display, when the state of any of the objects is set to be unacceptable, the network management apparatus displays the relevant object in red on the display device.

First Embodiment

Next, a first embodiment will be described. First, a method for modeling an NW configuration (physical and logical layers) will be described.

FIG. 1 is a diagram illustrating, in a tabular form, an example of modeling a network configuration applied to a network management apparatus according to the first embodiment of the present invention.

As illustrated in FIG. 1, Entities (information objects) including a physical structure (PS), a physical device (PD), a physical port (PP), an aggregate section (AS), a physical link (PL), and a physical connector (PC) are applied to a configuration of the physical layer. Entities including a topological link (TL), a network forwarding domain (NFD), a termination point encapsulation (TPE), a network connection (NC), a link connect (LC), and a cross (X) connect (XC) are applied to a configuration of the logical layer.

Such an application can hold the configurations of the physical layer and the logical layer in a unified format.

As illustrated in FIG. 1, Entity names in the physical layer are divided into PS, PD, PP, AS, PL, and PC. The "Entity name: meaning: correspondence relationship" corresponding to each Entity name is as follows:

PS (physical structure): facility such as building, manhole, and the like: device object PD (physical device): device: device object PP (physical port): communication port included in device: port object AS (aggregate section): cable: medium object PL (physical link): core wire of cable: medium object PC (physical connector): connector for connecting cable: medium object As illustrated in FIG. 1, the Entity names in the logical layer are divided into TL, NFD, TPE, NC, LC, and XC. The "Entity name: meaning: correspondence relationship" corresponding to each Entity name is as follows:

TL (topological link): connectivity between devices (within Logical Device layer (sometimes referred to as LD layer)): line object NFD (network forwarding domain): transferable range within device (within Logical Device layer): line or surface object TPE (terminal point encapsulation): termination point of communication: point object NC (network connection): End-End connectivity formed by LC and XC (described below) (within communication layer): communication object LC (link connect): connectivity between devices (within communication layer): line or surface object XC (cross (x) connect): connectivity within device (within communication layer): line or surface object Next, an application case of physical Entities will be described. FIG. 2 is a diagram illustrating an application case of the physical Entities applied to the network management apparatus according to the first embodiment of the present invention.

As illustrated in FIG. 2, a Physical Resource is divided into a device layer and a building layer.

In the example illustrated in FIG. 2, the device layer of the Physical Resource has PDs (NW devices), PDs (cable termination frames (CTFs): optical fiber termination devices), PLs (core wires), PCs (connectors), and PPs (ports). The PDs (NW devices) and PDs (CTFs) each include the PP (port), and the PC (connector) is attached to each of both ends of the PL (core line).

The PP (port) on the PD (NW device) side is connected to the PC (connector) at one end of the PL (core wire) and the PP (port) on the PD (CTF) side is connected to the PC (connector) at the other end of the PL (core wire), thereby communicatively connecting the PD (NW device) and the PD (CTF). The same applies to connections between the PDs (CTFs).

In an example illustrated in FIG. 2, the building layer of the Physical Resource has PSs (station buildings), PDs (NW devices), PDs (CTFs), and an Aggregate Section (cable). The Aggregate Section is an object having a plurality of PLs (core wires).

The PD (NW device) and the PD (CTF) are provided and communicatively connected to each other in each of the PSs (station buildings). In the example illustrated in FIG. 2, the PD (CTF) in a first PS (station building) and the PD (CTF) in a second PS (station building) are communicatively connected to each other via the Aggregate Section (cable).

Figure 3:
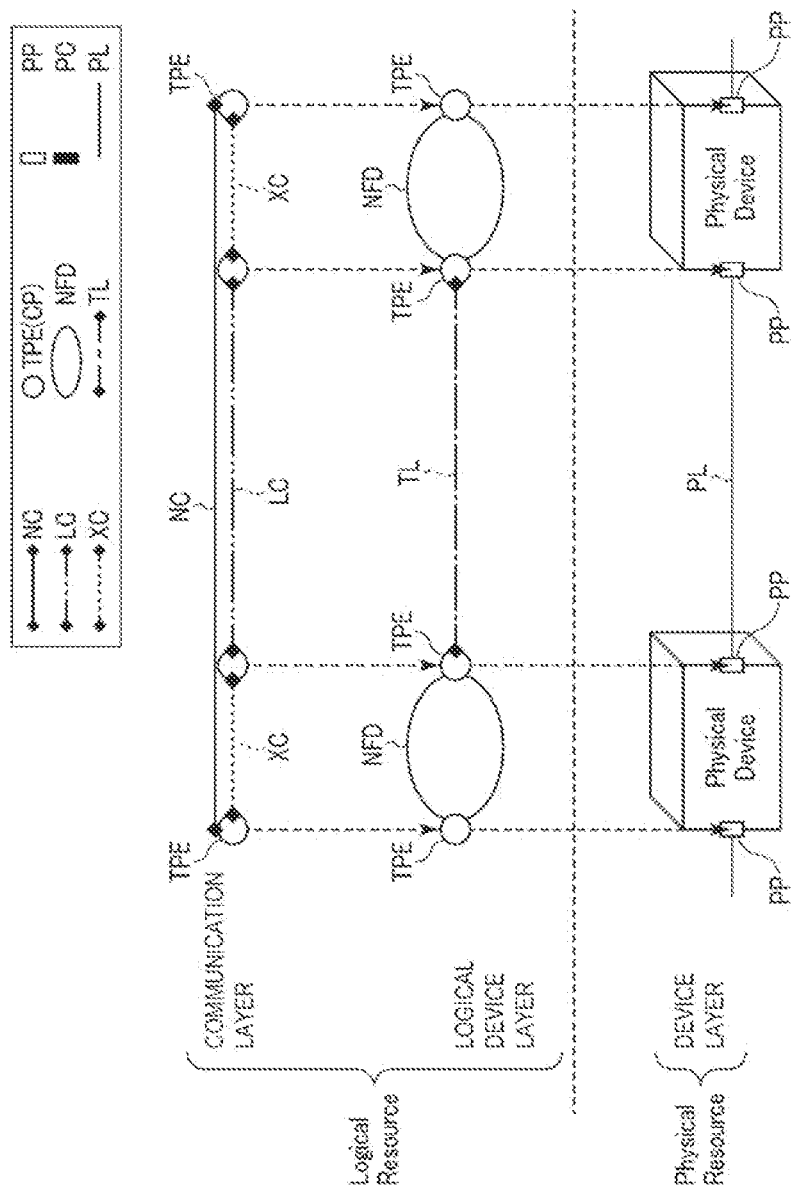
FIG. 3 is a diagram illustrating an application case of logical Entities applied to the network management apparatus according to the first embodiment of the present invention.

Next, an application case of logical Entities will be described. FIG. 3 is a diagram illustrating an application case of the logical Entities applied to the network management apparatus according to the first embodiment of the present invention.

In the example illustrated in FIG. 3, the Physical Resource has a device layer and the Logical Resource has a communication layer and a Logical Device layer. The Logical Device layer corresponds to an object in a lower layer relative to the communication layer, and the device layer corresponds to an object in a lower layer relative to the Logical Device layer. In the example illustrated in FIG. 3, in the device layer, the PPs of the Physical Devices are connected to a PC of one end of the PL and a PC of the other end of the PL.

The corresponding communication layer has TPEs, XCs, and an LC, and the Logical Device layer has TPEs, NFDs, and a TL. In FIG. 3, an object in a lower layer relative to a point object in a layer is indicated by an arrow.

In the example illustrated in FIG. 3, the Physical Devices of the device layer each correspond to the XC of the communication layer and the NFD of the Logical Device layer. The PPs of each of the Physical Devices correspond to the TPEs in the communication layer and the TPEs in the Logical Device layer. The same applies to the PCs attached to the PL.

The PL in the device layer corresponds to the LC in the communication layer and the TL in the Logical Device layer. Also, one NC is formed of the XCs and the LC in the communication layer.

Next, Entity definition of the physical layer will be described. FIG. 4 is a diagram illustrating, in a tabular form, an example of definition of the PS Entity in the physical layer applied to the network management apparatus according to the first embodiment of the present invention.

As shown in FIG. 4, the PS Entity has a state, a coordinate, and a device object array as attribute names The "attribute name: type" in each attribute name is as follows:

State: String (submerging, power depletion, collapse)

Coordinate: integer array having two-dimensional coordinate

Device object array: array in which device object (PD) is stored

The setting of the dimensionality in the coordinate will be described later.

FIG. 5 is a diagram illustrating, in a tabular form, an example of definition of the PD Entity in the physical layer applied to the network management apparatus according to the first embodiment of the present invention.

As shown in FIG. 5, the PD Entity has a state, a coordinate, and a port object as attribute names The "attribute name: type" in each attribute name is as follows:

State: Boolean

Coordinate: integer array having two-dimensional coordinate

Port object: array in which port object (PP) is stored

FIG. 6 is a diagram illustrating, in a tabular form, an example of definition of the PP Entity in the physical layer applied to the network management apparatus according to the first embodiment of the present invention.

As shown in FIG. 6, the PP Entity has a state and a coordinate as attribute names. The "attribute name: type" in each attribute name is as follows:

State: Boolean

Coordinate: integer array having two-dimensional coordinate

FIG. 7 is a diagram illustrating, in a tabular form, an example of definition of the AS Entity in the physical layer applied to the network management apparatus according to the first embodiment of the present invention.

As shown in FIG. 7, the AS Entity has a state and a medium object array as attribute names The "attribute name: type" in each attribute name is as follows:

State: String (connection, cutting, corrosion)

Medium object array: array in which medium object (PL) is stored

FIG. 8 is a diagram illustrating, in a tabular form, an example of definition of the PL Entity in the physical layer applied to the network management apparatus according to the first embodiment of the present invention.

As shown in FIG. 8, the PL Entity has a state and a connector object array as attribute names. The "attribute name: type" in each attribute name is as follows:

State: Boolean (connection, cutting)

Connector object array: array in which connector object (PC) is stored

FIG. 9 is a diagram illustrating, in a tabular form, an example of definition of the PC Entity in the physical layer applied to the network management apparatus according to the first embodiment of the present invention.

As shown in FIG. 9, the PL Entity has a state and a port object as attribute names. The "attribute name: type" in each attribute name is as follows:

State: Boolean (connection, coming off)

Port object: array in which port object (PP) is stored

Next, Entity definition of the logical layer will be described. FIG. 10 is a diagram illustrating, in a tabular form, an example of definition of the LC Entity, the XC Entity, the TL Entity, and the NFD Entity in the logical layer applied to the network management apparatus according to the first embodiment of the present invention.

As shown in FIG. 10, the LC Entity, the XC Entity, the TL Entity, and the NFD Entity have a point connector object array and a state as attribute names The "attribute name: type" in each attribute name is as follows:

Point object array: TPE (point object) array constituting LC, XC, TL, and NFD

State: Boolean

FIG. 11 is a diagram illustrating, in a tabular form, an example of definition of the TPE Entity in the logical layer applied to the network management apparatus according to the first embodiment of the present invention.

As shown in FIG. 11, the TPE Entity has a subobject, a port object array, a coordinate, and a state as attribute names. The "attribute name: type" in each attribute name is as follows:

Subobject: point object (TPE) corresponding to lower layer

Port Object array: array in which port object (PP) is stored

Coordinate: integer array having two-dimensional coordinate

State: Boolean

FIG. 12 is a diagram illustrating, in a tabular form, an example of definition of the NC Entity in the logical layer applied to the network management apparatus according to the first embodiment of the present invention.

As shown in FIG. 12, the NC Entity has a point object array, a state, and a service subscriber information as attribute names. The "attribute name: type" in each attribute name is as follows:

Point object array: all TPE (point object) array between starting point and end point of communication State: Boolean Service subscriber information: String array or uniform resource locator (URL)

The service subscriber information may be information acquired from the operation system (OpS) data for each NC, or may be information designated by the URL of the subscriber information acquisition interface (IF) of the OpS.

Figure 13:
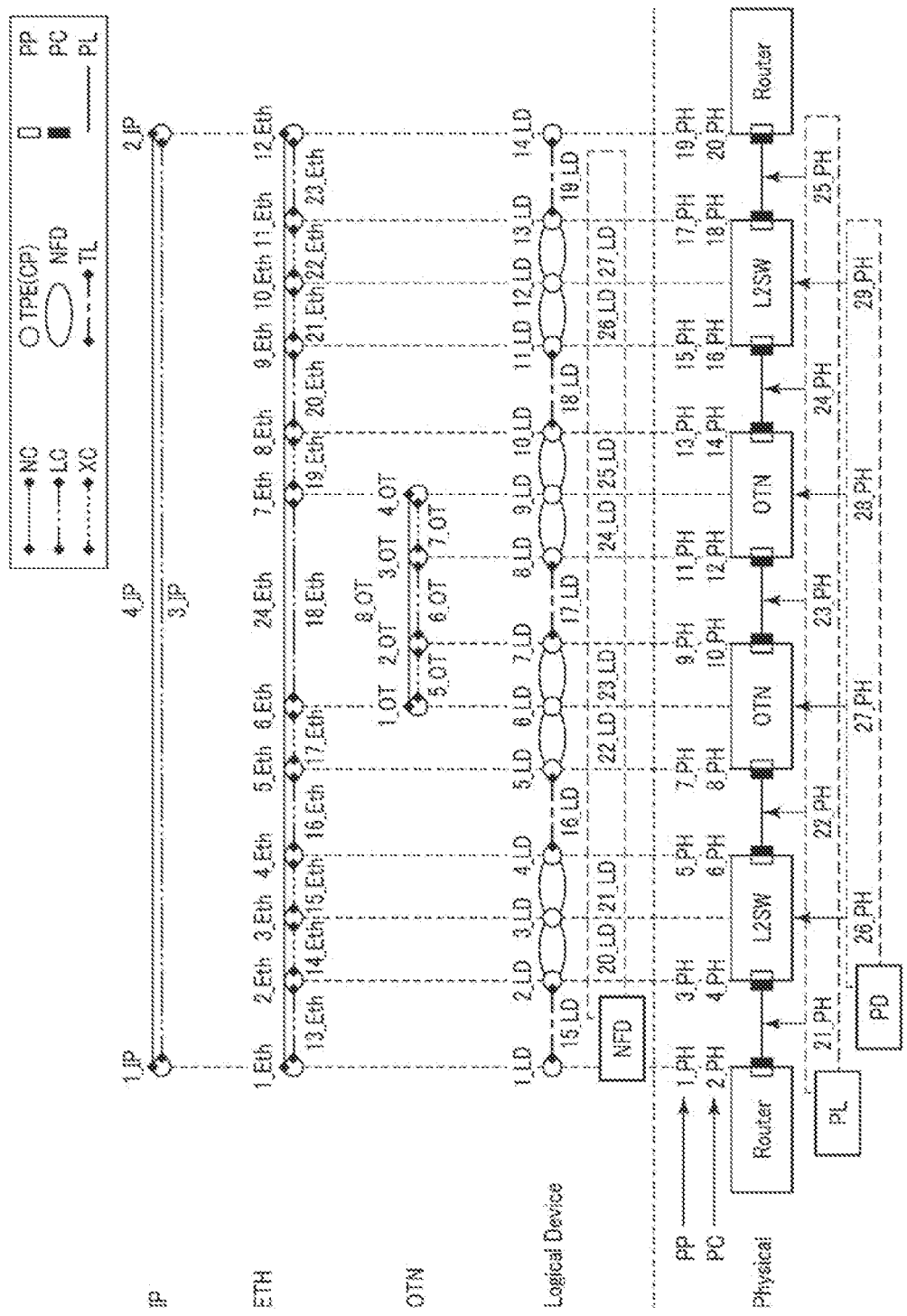
FIG. 13 is a diagram for explaining an example of creating Entities by the network management apparatus according to the first embodiment of the present invention.

The creation of an Entity will now be described. FIG. 13 is a diagram for explaining an example of creating Entities by the network management apparatus according to the first embodiment of the present invention.

In FIG. 13, the creation of point, line, or surface objects, and communication objects will be described.

In the example illustrated in FIG. 13, the logical layer has an Internet protocol (IP) layer, an Ethernet (trade name) (ETH) layer, an optical transport network (OTN) layer, and a Logical Device layer, and the physical layer has a Physical layer. Dotted lines between layers in FIG. 13 indicate correspondence relationships between objects in the layers.

IP LAYER

The IP layer has TPEs (connection points (CPs)) (1_IP, 2_IP), an LC (3_IP), and an NC (4_IP).

ETH Layer

The ETH layer has TPEs (CPs) (1 to 12_Eths), LCs (13, 16, 18, 20, 23_Eths), XCs (14, 15, 17, 19, 21, 22_Eths), and an NC (24_Eth).

The 1 to 12_Eths are provided in numerical order from the 1_IP side to the 2_IP side. The same applies to the 13 to 23_Eths. For example, the 13_Eth is provided between the 1_Eth and the 2_Eth and the 23_Eth is provided between the 11_Eth and the 12_Eth.

The 1_Eth and the 12_Eth correspond to the 1_IP and the 2_IP in the IP layer on a one-to-one basis.

OTN Layer

The OTN layer has TPEs (CPs) (1 to 4_OTs), XCs (5, 7_OTs), an LC (6_OT), and an NC (8_OT).

The 1_OT to the 4_OT are provided in numerical order from the 1_IP side to the 2_IP side. The same applies to the 5_OT to the 7_OT. For example, the 5_OT is provided between the 1_OT and the 2_OT, the 6_OT is provided between the 2_OT and the 3_OT, and the 7_OT is provided between the 3_OT and the 4_OT.

The 1_OT and the 4_OT correspond to the 6_Eth and the 7_Eth in the ETH layer on a one-to-one basis. Also, the 5 to 8_OTs correspond to the 18_Eth in the Eth layer.

Logical Device Layer

The Logical Device layer has TPEs (CPs) (1 to 14_LDs), TLs (15 to 19_LDs), and NFDs (20 to 27_LDs).

The 1 to 14_LDs are provided in numerical order from the 1_IP side to the 2_IP side. The same applies to the 15 to 19_LDs and the 20 to 27_LDs. For example, the 15_LD is provided between the LLD and the 2_LD and the 19_LD is provided between the 13_LD and the 14_LD. The 20_LD corresponds to the NFD between the 2_LD and the 3_LD, the 21_LD corresponds to the NFD between the 3_LD and the 4_LD, the 22_LD corresponds to the NFD between the 5_LD and the 6_LD, the 23_LD corresponds to the NFD between the 6_LD and the 7_LD, the 24_LD corresponds to the NFD between the 8_LD and the 9_LD, the 25_LD corresponds to the NFD between the 9_LD and the 10_LD, the 26_LD corresponds to the NFD between the 11_LD and the 12_LD, and the 27_LD corresponds to the NFD between the 12_LD and the 13_LD.

The 1 to 14_LDs correspond to the 1 to 6_Eths, the 2_OT, the 3_OT, and the 7 to 12_Eths in the ETH and OTN layers on a one-to-one basis. The 15 to 19_LDs correspond to the 12, 15, 18, 20, and 22_Eths in the ETH layer on a one-to-one basis. The 17_LD also corresponds to the 6_OT in the OTN layer.

The 5 to 7_LDs also correspond to the 1, 2, 5, and 8_OTs in the OTN layer.

Physical Layer

The Physical layer includes a Router (first (1_IP side)), an L2SW (L2 switch) (first (1_IP side)), an OTN (first (1_IP side)), an OTN (second (2_IP side)), an L2SW (second (2_IP side)), and a Router (second (2_IP side)), which are communicatively connected in series from the 1_IP side to the 2_IP side. The Physical layer has PPs (1, 3, 5, 7, 9, 11, 13, 15, 17, 19_PHs), PCs (2, 4, 6, 8, 10, 12, 14, 16, 18, 20_PH), PLs (21 to 25_PHs), and PDs (26 to 29_PHs), which are provided in numerical order from the 1_IP side to the 2_IP side.

The 21_PH between the Router (first) and the L2SW (first) corresponds to the 15_LD in the Logical Device layer, the 22_PH between the L2SW (first) and the OTN (first) corresponds to the 16_LD, the 23_PH between the OTN (first) and the OTN (second) corresponds to the 17_LD, the 24_PH between the OTN (second) and the L2SW (second) corresponds to the 18_LD, and the 25_PH between the L2SW (second) and the Router (second) corresponds to the 19_LD.

The 7, 9, and 27_PHs correspond to the 5 to 7_LDs.

The 26_PH to 29_PH correspond to the L2SW (first), the OTN (first), the OTN (second), and the L2SW (second) on a one-to-one basis. Further, the 26_PH corresponds to the 20 and 21_LDs, the 27_PH corresponds to the 22 and 23_LDs, the 28_PH corresponds to the 24 and 25_LDs, and the 29_PH corresponds to the 26 and 27_LDs.

The 1 and 3_PHs correspond to the PPs between the Router (first) and the L2SW (first), the 5 and 7_PHs correspond to the PPs between the L2SW (first) and the OTN (first), the 9 and 11_PHs correspond to the PPs between the OTN (first) and the OTN (second), the 13 and 15_PH correspond to the PPs between the OTN (second) and the L2SW (second), and the 17 and 19_PHs correspond to the PPs between the L2SW (second) and the Router (second).

The 2 and 4_PHs correspond to the PCs between the Router (first) and the L2SW (first), the 6 and 8_PHs correspond to the PCs between the L2SW (first) and the OTN (first), the 10 and 12_PHs correspond to the PCs between the OTN (first) and the OTN (second), the 14 and 16_PHs correspond to the PCs between the OTN (second) and the L2SW (second), and the 18 and 20_PHs correspond to the PCs between the L2SW (second) and the Router (second).

Further, the 1 and 2_PHs correspond to the LLD, the 3 and 4_PHs correspond to the 2_LD, the 5 and 6_PH correspond to the 4_LD, the 7 and 8_PHs correspond to the 5_LD, the 9 and 10_PHs correspond to the 7_LD, the 11 and 12_PHs correspond to the 8_LD, the 13 and 14_PHs correspond to the 10_LD, the 15 and 16_PHs correspond to 11_LD, the 17 and 18_PHs correspond to the 13_LD, and the 19 and 20_PH correspond to the 14_LD.

Second Embodiment

Next, a second embodiment will be described. In this second embodiment, identification and display of an influence range associated with occurrence of a port abnormality in an Entity to be managed will be described.

Figure 14:
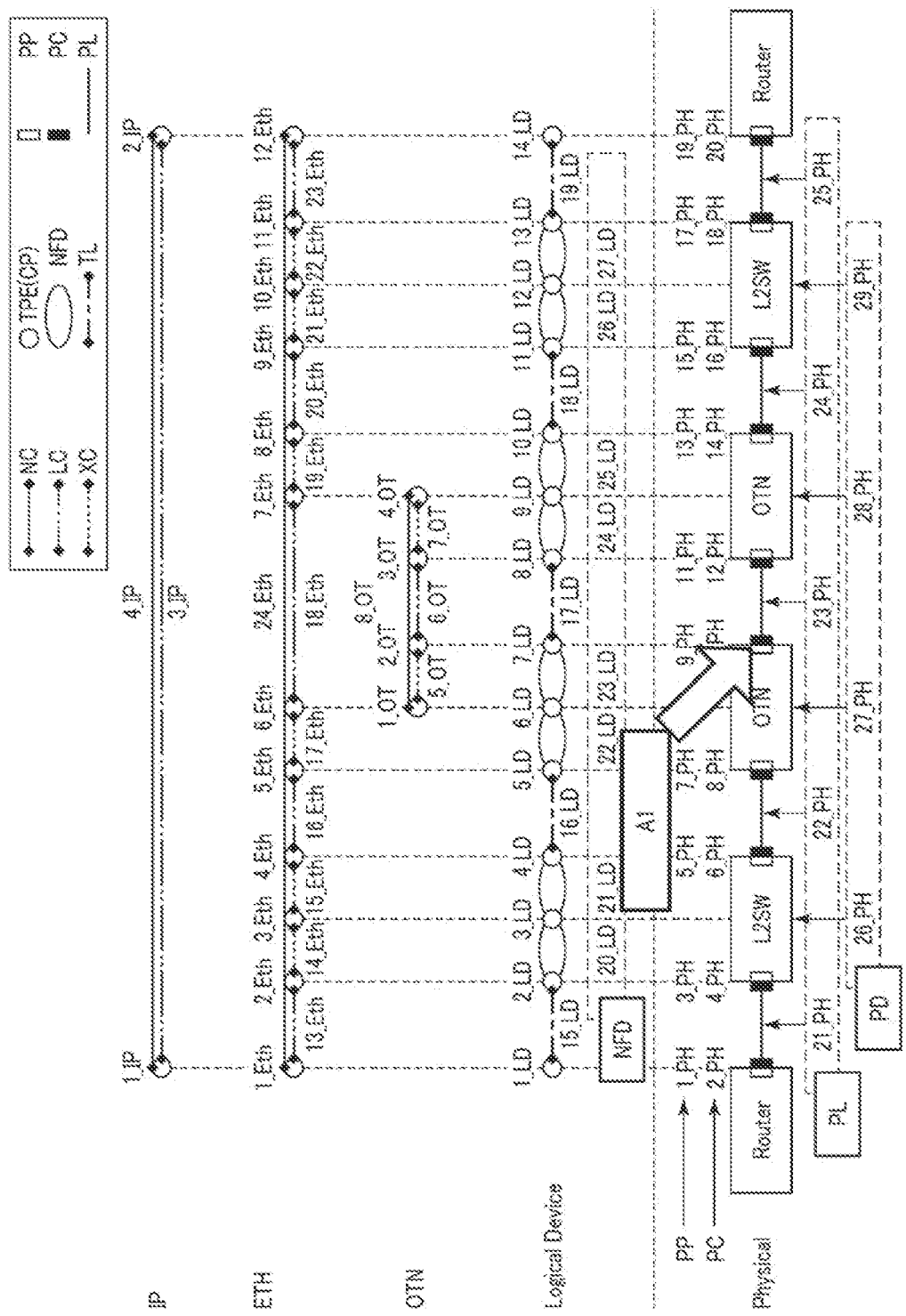
FIG. 14 is a diagram for explaining an example of designation of occurrence of a port failure in Entities to be managed by a network management apparatus according to a second embodiment of the present invention.

First, identification and display of the influence range (when a port failure occurs) will be described. FIG. 14 is a diagram for explaining an example of designation of occurrence of a port failure in Entities to be managed by a network management apparatus according to the second embodiment of the present invention.

In the example illustrated in FIG. 14, a user designates a PP on an OTN (second) side of PPs (ports) in the OTN (first) (see A1 in FIG. 14) as a place where a failure has occurred.

Figure 15:
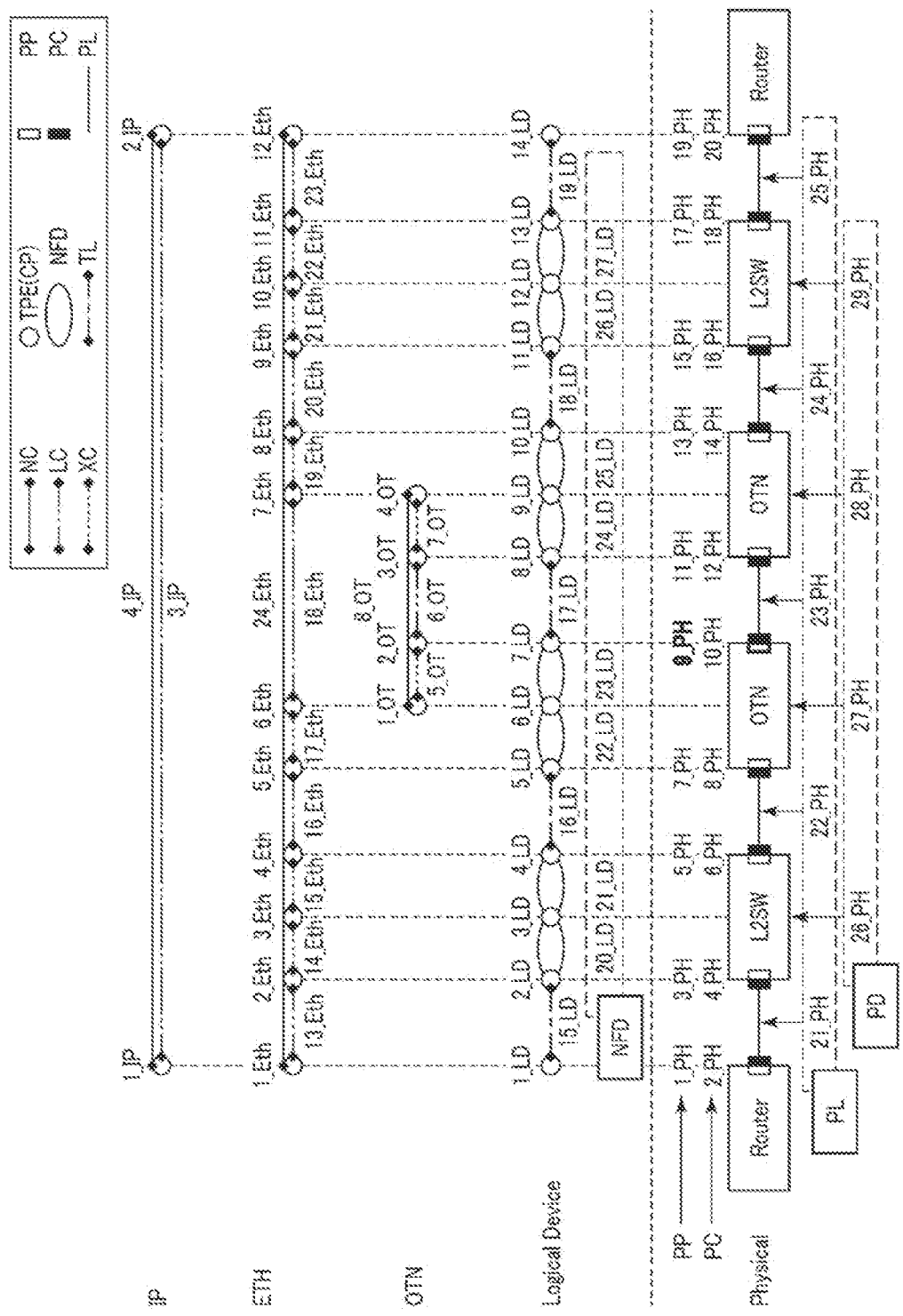
FIG. 15 is a diagram for explaining an example of an influence range in a Physical layer in Entities to be managed by the network management apparatus according to the second embodiment of the present invention.

Next, a method for identifying an influence range in a Physical layer will be described. FIG. 15 is a diagram for explaining an example of an influence range in the Physical layer in the Entities to be managed by the network management apparatus according to the second embodiment of the present invention.

In the example illustrated in FIG. 15, only a PP (9_PH), which is a port object corresponding to a port that is the above designated failure location in the Physical layer, is identified as the influence range. In FIG. 15, the influence range, PP (9_PH), is highlighted in bold. The same applies to other influence ranges identified hereinafter.

Figure 16:
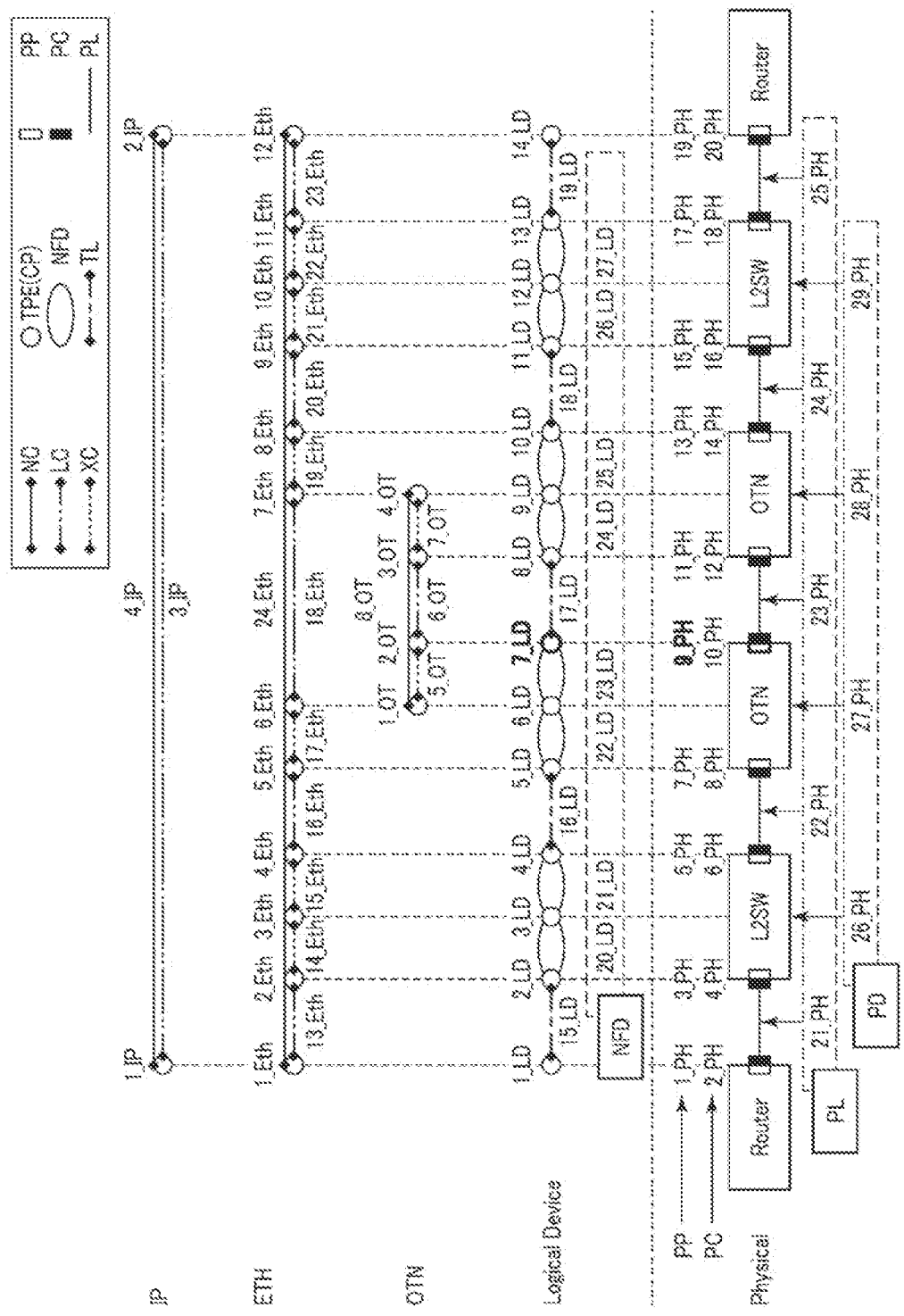
FIG. 16 is a diagram for explaining an example of an influence range in a Logical Device layer in Entities to be managed by the network management apparatus according to the second embodiment of the present invention.

Next, a method for identifying an influence range in a Logical Device layer will be described. FIG. 16 is a diagram for explaining an example of an influence range in the Logical Device layer in the Entities to be managed by the network management apparatus according to the second embodiment of the present invention.

In the example illustrated in FIG. 16, a TPE (7_LD) in the Logical Device layer, which is an Entity corresponding to the PP (9_PH), is identified as the influence range, the PP (9_PH) being the port which is the failure location in the Physical layer.

Figure 17:
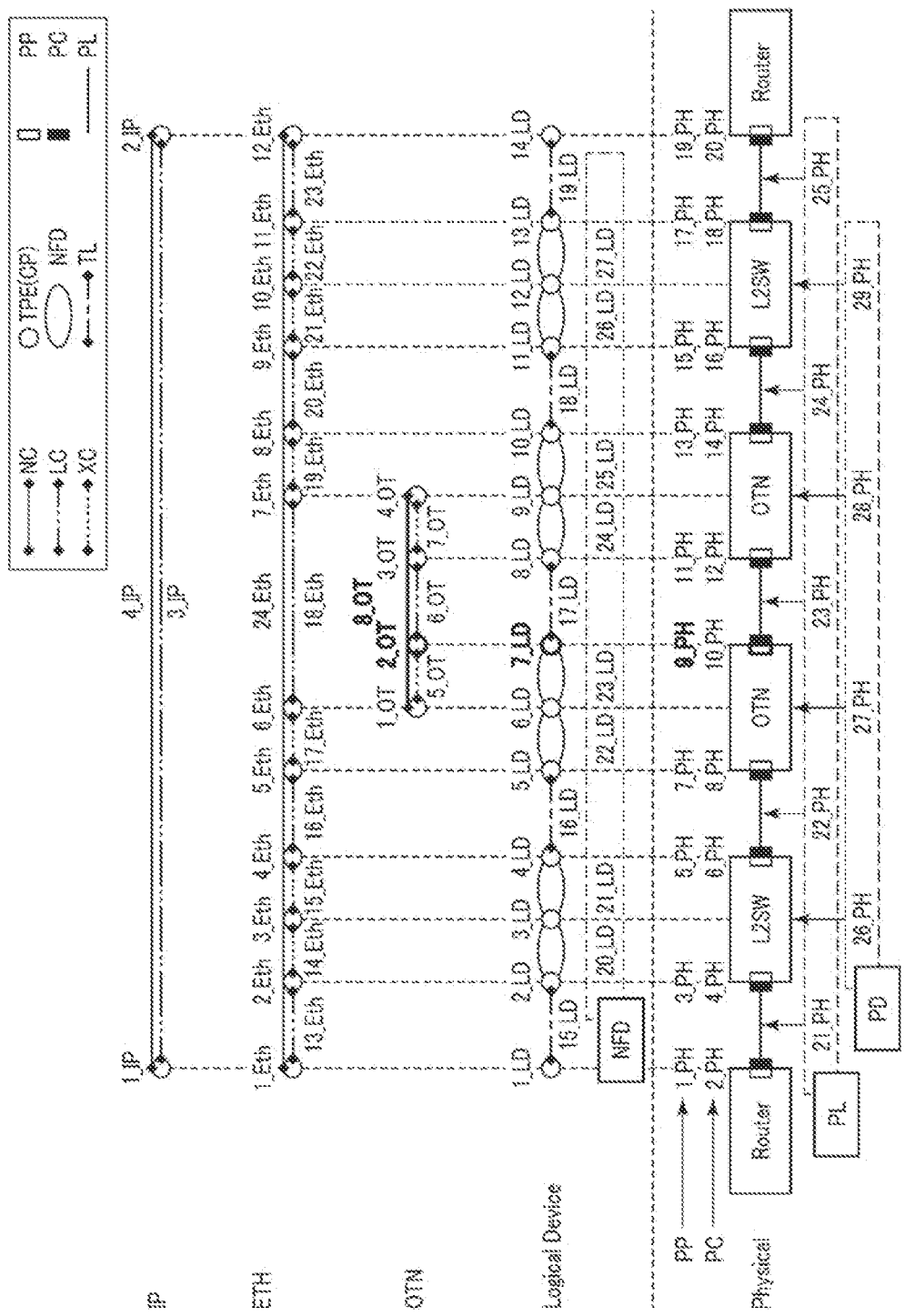
FIG. 17 is a diagram for explaining an example of an influence range in an OTN layer in Entities to be managed by the network management apparatus according to the second embodiment of the present invention.

Next, a method for identifying an influence range in an OTN layer will be described. FIG. 17 is a diagram for explaining an example of an influence range in the OTN layer in the Entities to be managed by the network management apparatus according to the second embodiment of the present invention.

In the example illustrated in FIG. 17, a TPE (2_OT) in the OTN layer, which is an Entity corresponding to the TPE (7_LD) in the Logical Device layer, and an NC (8_OT) related to the TPE (2_OT) are each identified as the influence range.

Figure 18:
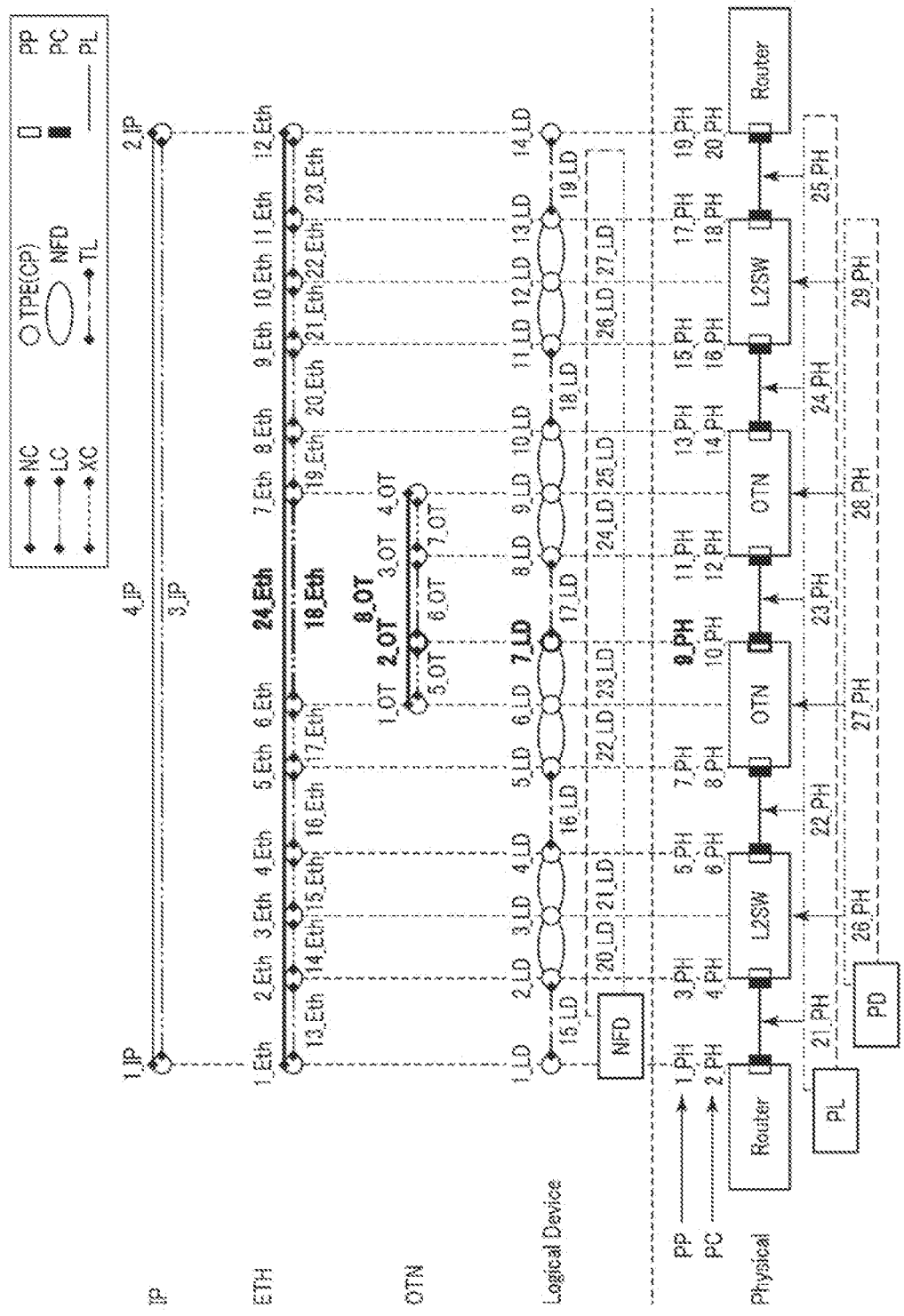
FIG. 18 is a diagram for explaining an example of an influence range in an ETH layer in Entities to be managed by the network management apparatus according to the second embodiment of the present invention.

Next, a method for identifying an influence range in an ETH layer will be described. FIG. 18 is a diagram for explaining an example of an influence range in the ETH layer in the Entities to be managed by the network management apparatus according to the second embodiment of the present invention.

In the example illustrated in FIG. 18, an LC (18_Eth) and an NC (24_Eth) in the ETH layer, which are Entities corresponding to the NC (8_OT) in the OTN layer, are each identified as the influence range.

Figure 19:
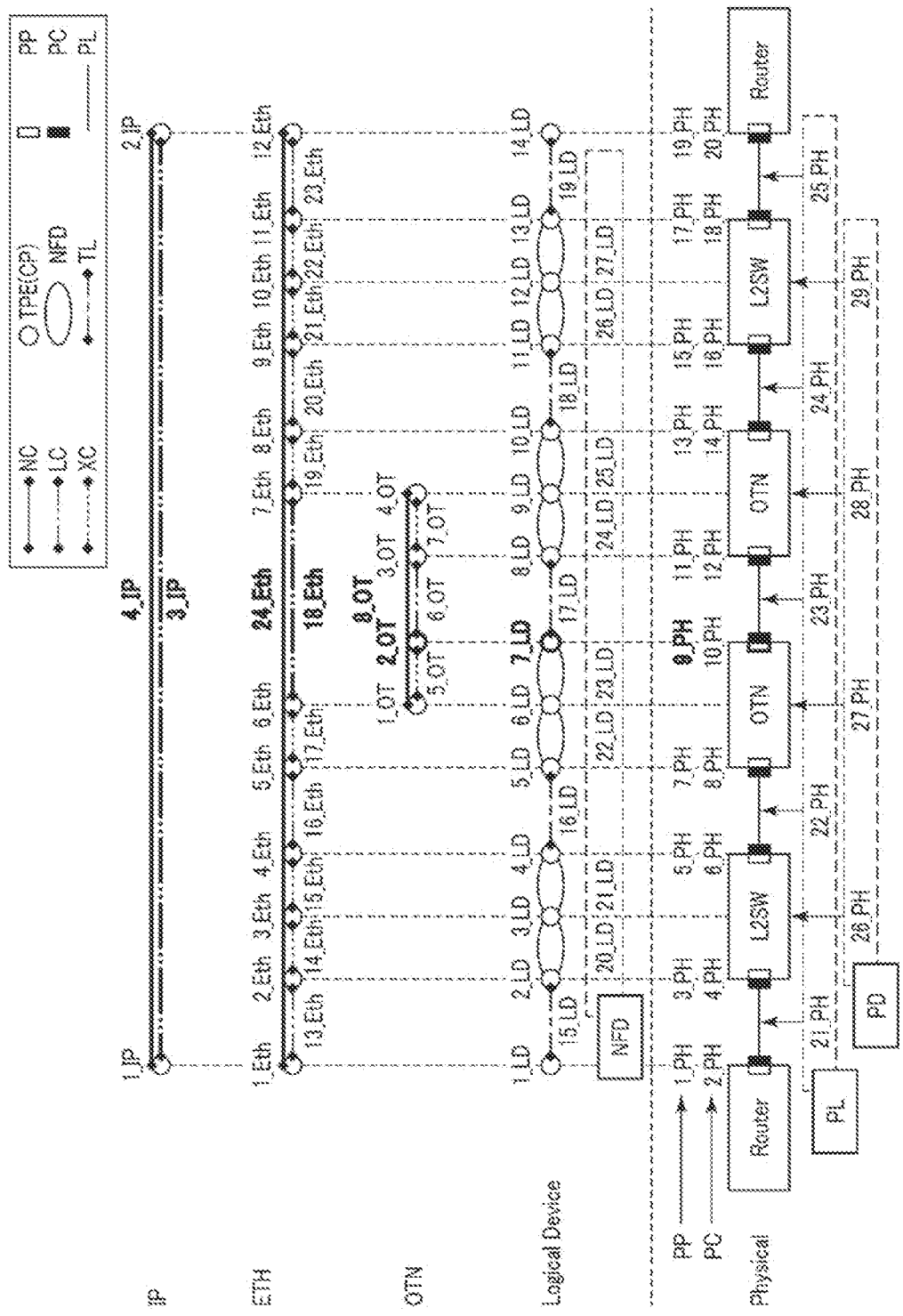
FIG. 19 is a diagram for explaining an example of an influence range in an IP layer in Entities to be managed by the network management apparatus according to the second embodiment of the present invention.

Next, a method for identifying an influence range in an IP layer will be described. FIG. 19 is a diagram illustrating an example of an influence range in the IP layer in the Entities to be managed by the network management apparatus according to the second embodiment of the present invention.

In the example illustrated in FIG. 19, an LC (3_IP) and an NC (4_IP) in the IP layer, which are Entities corresponding to the NC (24_Eth) in the ETH layer, are each identified as the influence range.

Third Embodiment

Next, a third embodiment will be described. In this third embodiment, identification and display of an influence range associated with occurrence of a device abnormality in Entities to be managed will be described.

Figure 20:
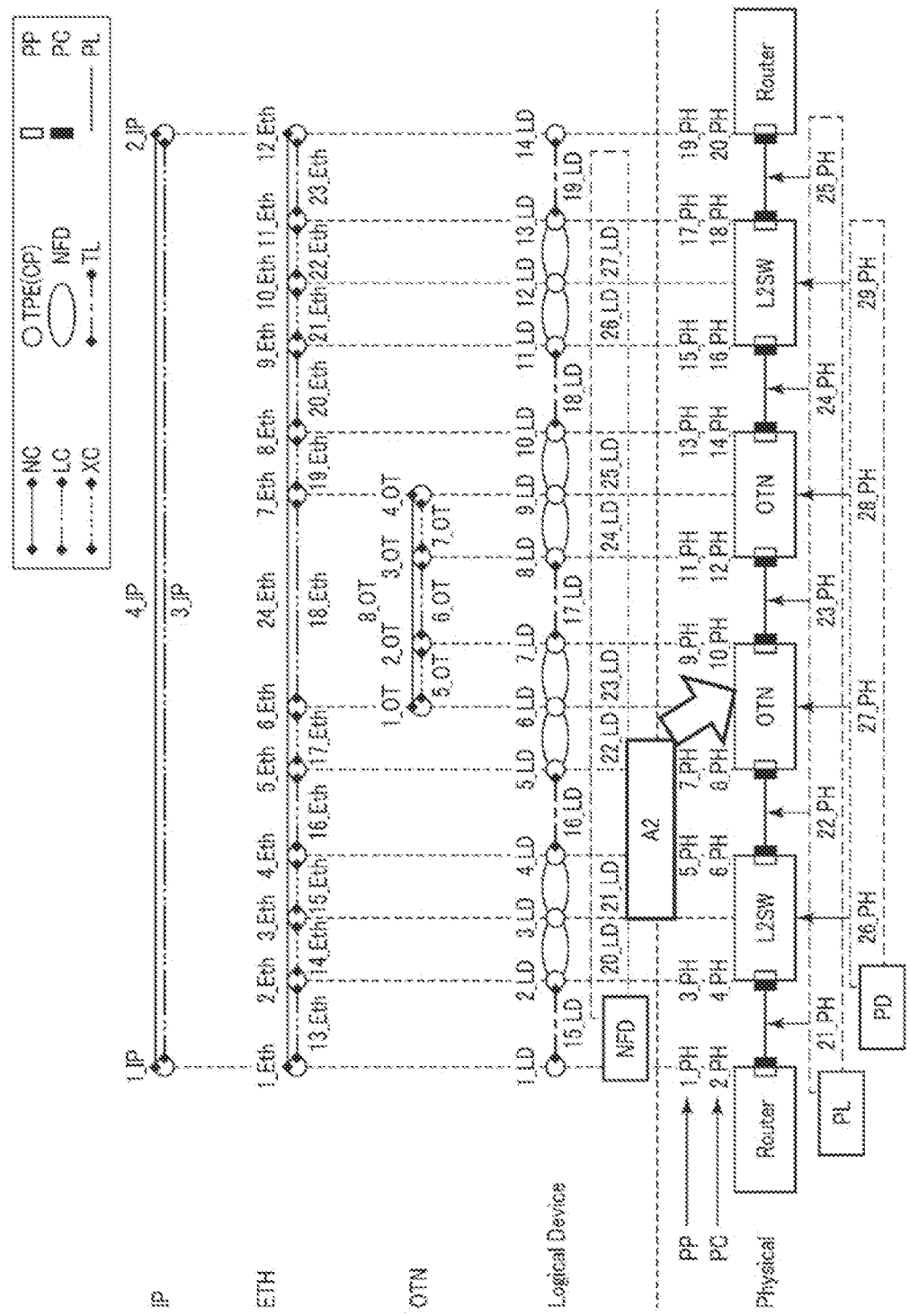
FIG. 20 is a diagram for explaining an example of designation of a port failure occurrence in Entities to be managed by a network management apparatus according to a third embodiment of the present invention.

First, identification and display of an influence range (in a case where a device failure occurs) will be described. FIG. 20 is a diagram for explaining an example of designation of occurrence of a port failure in Entities to be managed by a network management apparatus according to the third embodiment of the present invention.

In the example illustrated in FIG. 20, a user designates an OTN (first) (A2 in FIG. 20) as a place where a failure has occurred.

Figure 21:
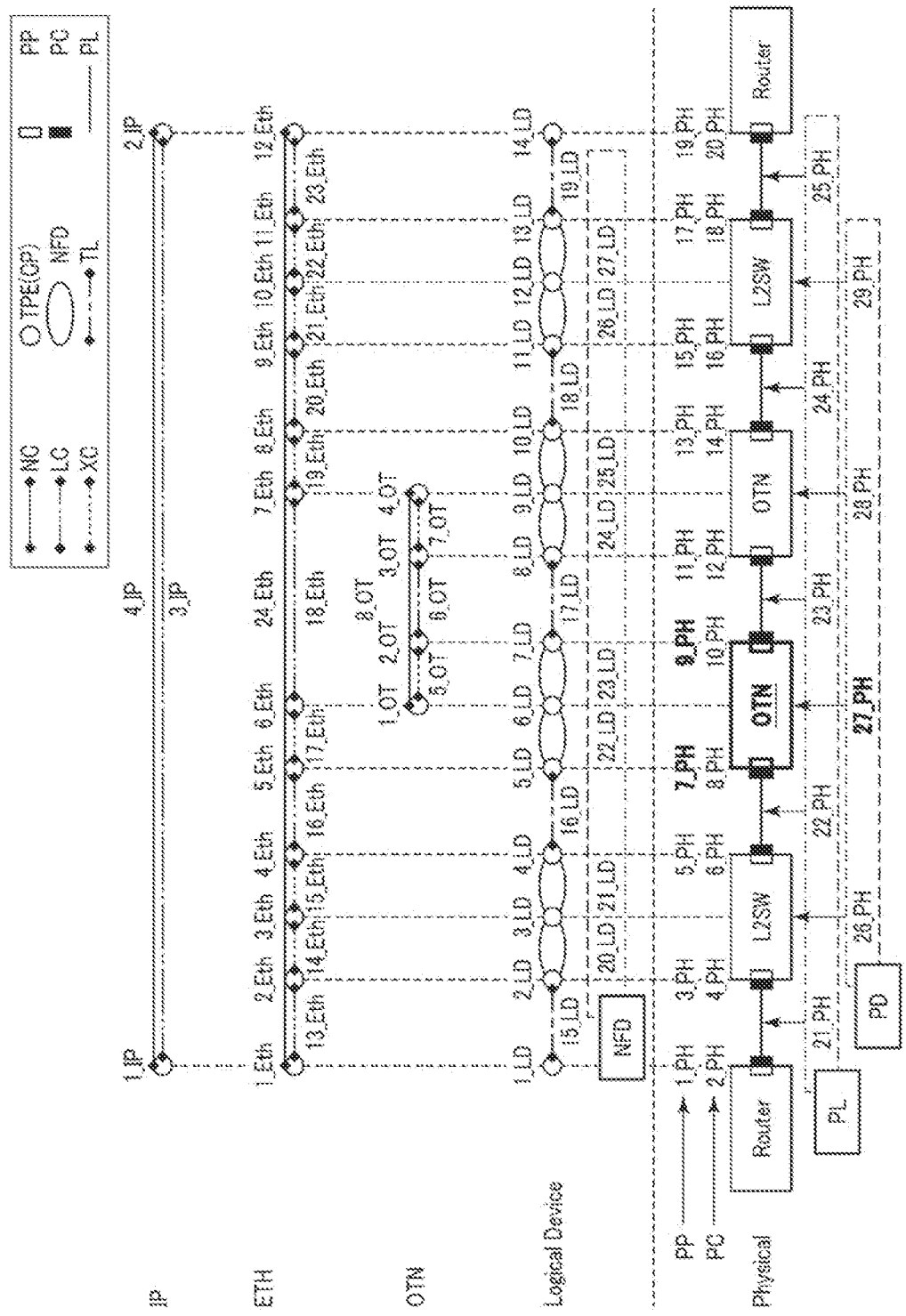
FIG. 21 is a diagram for explaining an example of an influence range in a Physical layer in Entities to be managed by the network management apparatus according to the third embodiment of the present invention.

Next, a method for identifying an influence range in a Physical layer will be described. FIG. 21 is a diagram for explaining an example of the influence range in the Physical layer in the Entities to be managed by the network management apparatus according to the third embodiment of the present invention.

In the example illustrated in FIG. 21, regarding PPs (failure locations), which are devices as the failure locations designated above in the Physical layer, (1) a device object (27_PH) of an OTN device (first) body (highlighted by underlined OTN) and (2) port objects (7, 9_PH) of both ports included in the OTN device (first) are identified as influence ranges in this order.

Figure 22:
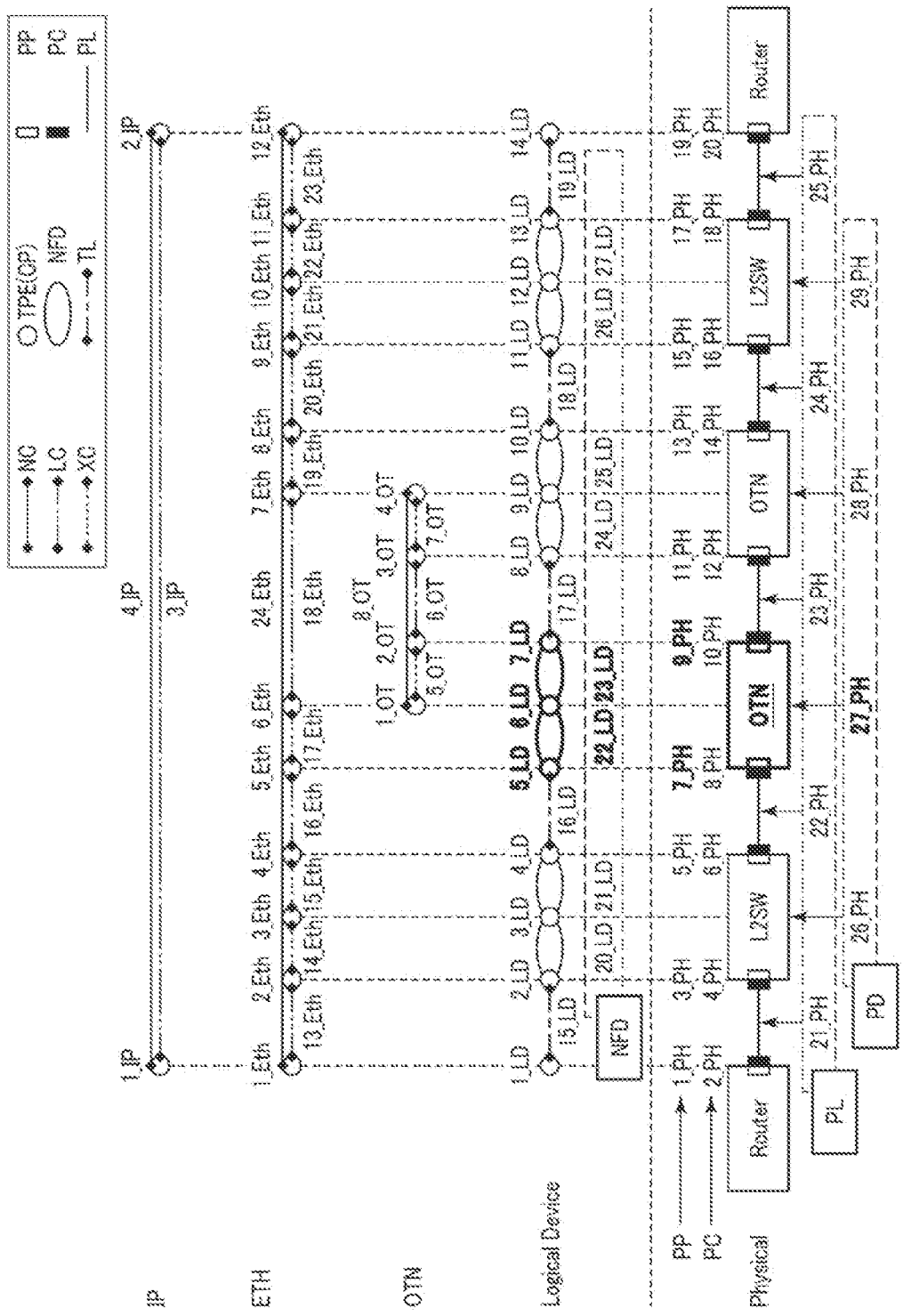
FIG. 22 is a diagram for explaining an example of an influence range in a Logical Device layer in Entities to be managed by the network management apparatus according to the third embodiment of the present invention.

Next, a method for identifying an influence range in a Logical Device layer will be described. FIG. 22 is a diagram for explaining an example of the influence range in the Logical Device layer in the Entities to be managed by the network management apparatus according to the third embodiment of the present invention.

In the example illustrated in FIG. 22, TPEs (5 to 7_LDs) and NFDs (22, 23_LDs) in the Logical Device layer, which are Entities corresponding to the influence range of the device failure, are each identified as the influence range, the influence range of the device failure being the failure location in the Physical Layer.

Figure 23:
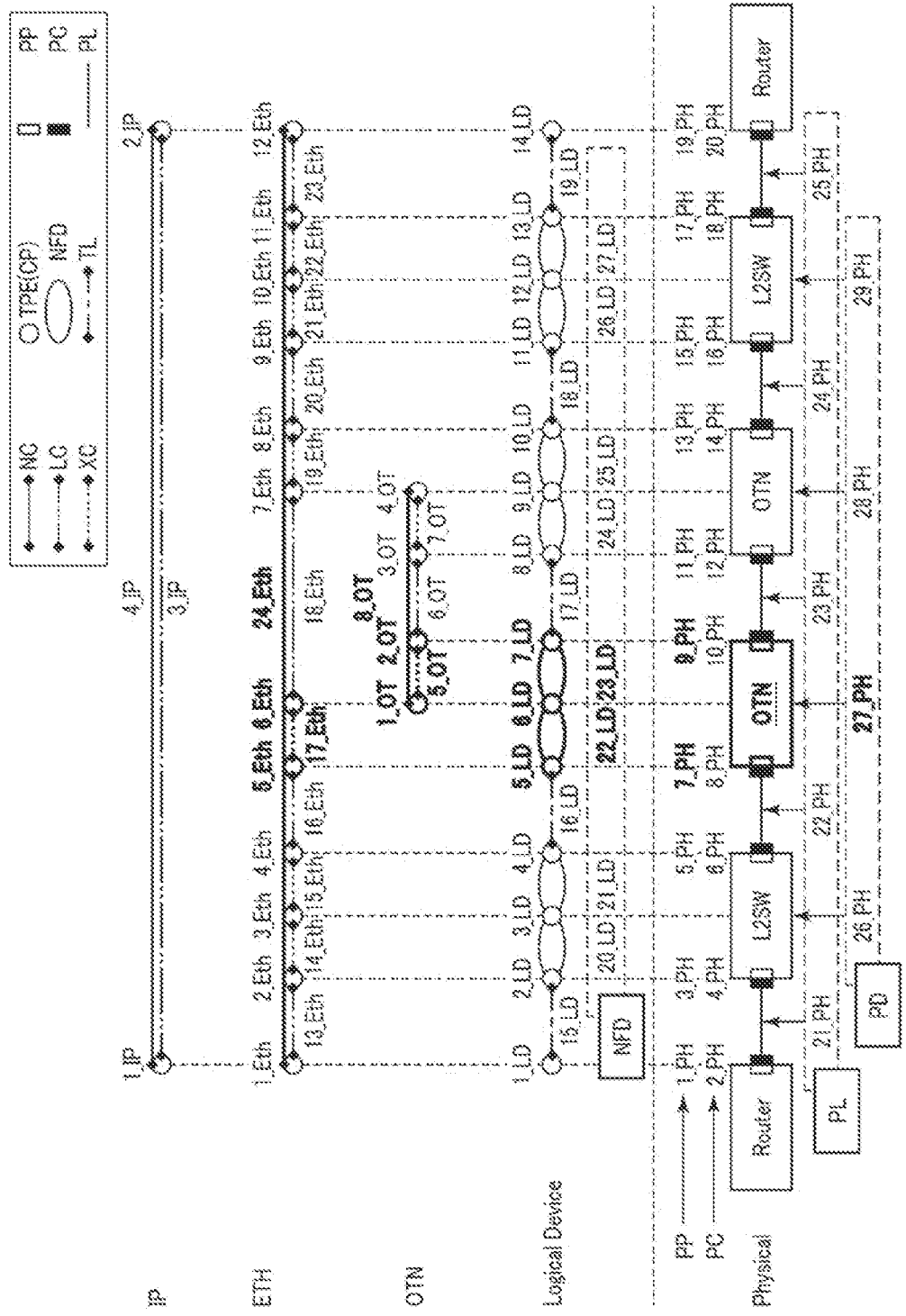
FIG. 23 is a diagram for explaining an example of an influence range in an OTN layer in Entities to be managed by the network management apparatus according to the third embodiment of the present invention.

Next, a method for identifying an influence range in an OTN layer will be described. FIG. 23 is a diagram for explaining an example of the influence range in the OTN layer in the Entities to be managed by the network management apparatus according to the third embodiment of the present invention.

In the example illustrated in FIG. 23, (1) TPEs (1, 2_OTs), an XC (5_OT), and an NC (8_OT) in the OTN layer, and (2) TPEs (5, 6_Eth), an XC (17_Eth), and an NC (24_Eth) in the ETH layer, which are Entities corresponding to the NFDs (22, 23_LDs) in the Logical Device layer, that is, Entities including all elements of a point object array of the NFDs (22, 23_LDs), are each identified as the influence range.

Figure 24:
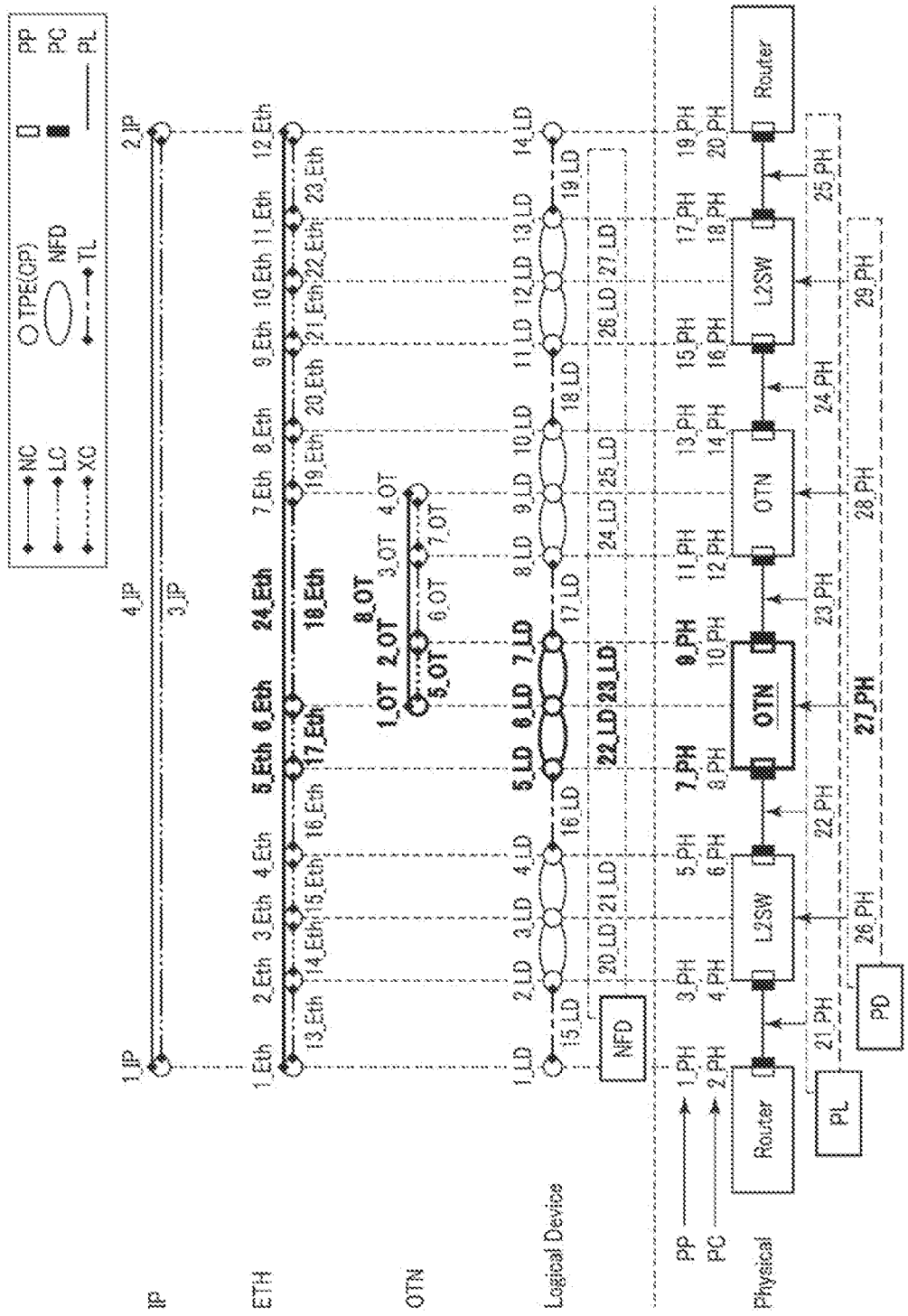
FIG. 24 is a diagram for explaining an example of an influence range in an ETH layer in Entities to be managed by the network management apparatus according to the third embodiment of the present invention.

Next, a method for identifying an influence range in an ETH layer will be described. FIG. 24 is a diagram for explaining an example of the influence range in the ETH layer in the Entities to be managed by the network management apparatus according to the third embodiment of the present invention.

In the example illustrated in FIG. 24, an LC (18_Eth) in the ETH layer, which is an Entity corresponding to the TPEs (1, 2_OTs) and the NC (8_OT) in the OTN layer, is identified as the influence range.

Figure 25:
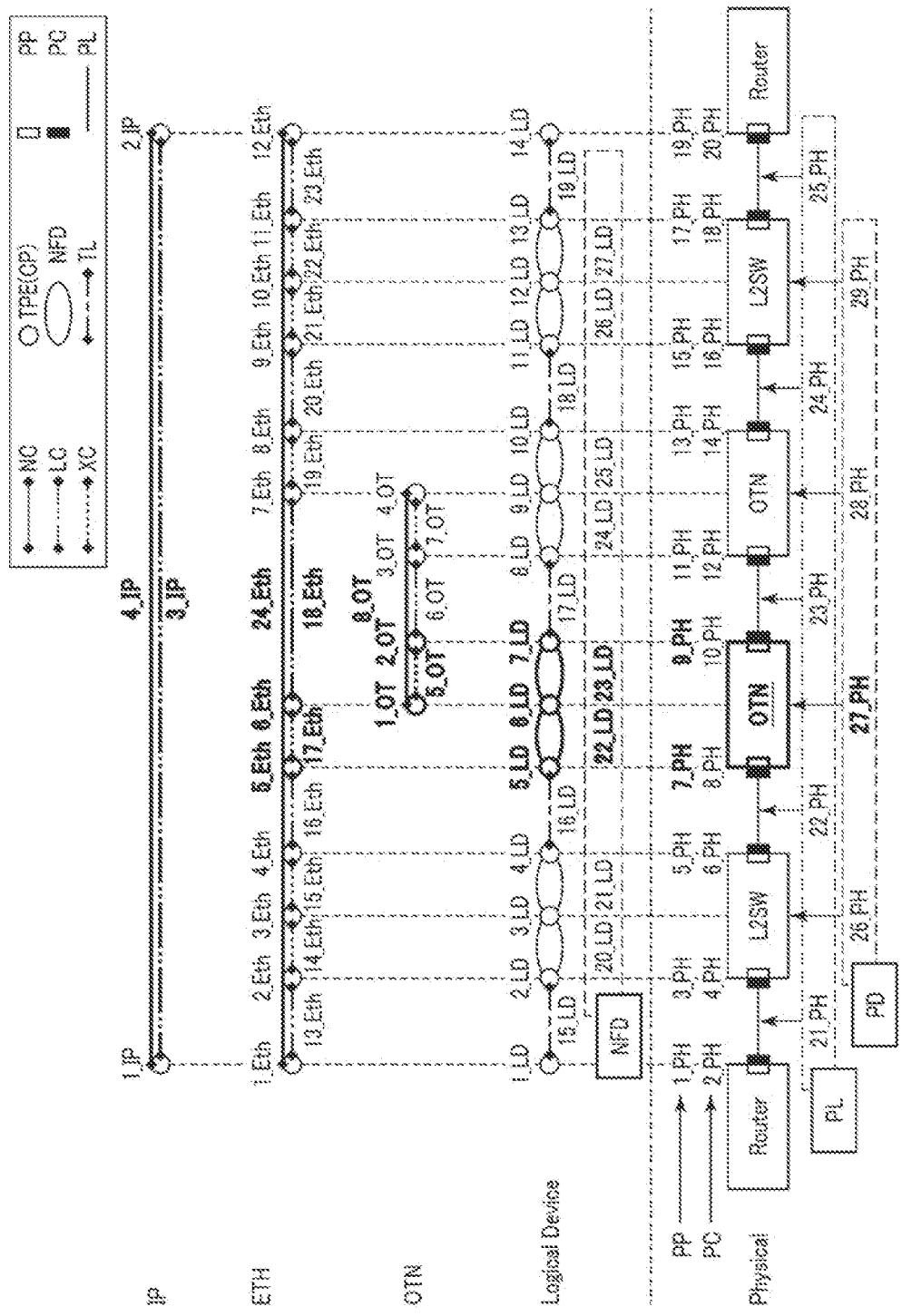
FIG. 25 is a diagram for explaining an example of an influence range in an IP layer in Entities to be managed by the network management apparatus according to the third embodiment of the present invention.

Next, a method for identifying an influence range in an IP layer will be described. FIG. 25 is a diagram for explaining an example of the influence range in the IP layer in the Entities to be managed by the network management apparatus according to the third embodiment of the present invention.

In the example illustrated in FIG. 25, an LC (3_IP) and an NC (4_IP) in the IP layer, which are Entities corresponding to the NC (24_Eth) in the ETH layer are each identified as the influence range.

Fourth Embodiment

Next, a fourth embodiment will be described. In this fourth embodiment, identification and display of an influence range associated with occurrence of a medium failure in Entities to be managed will be described.

Figure 26:
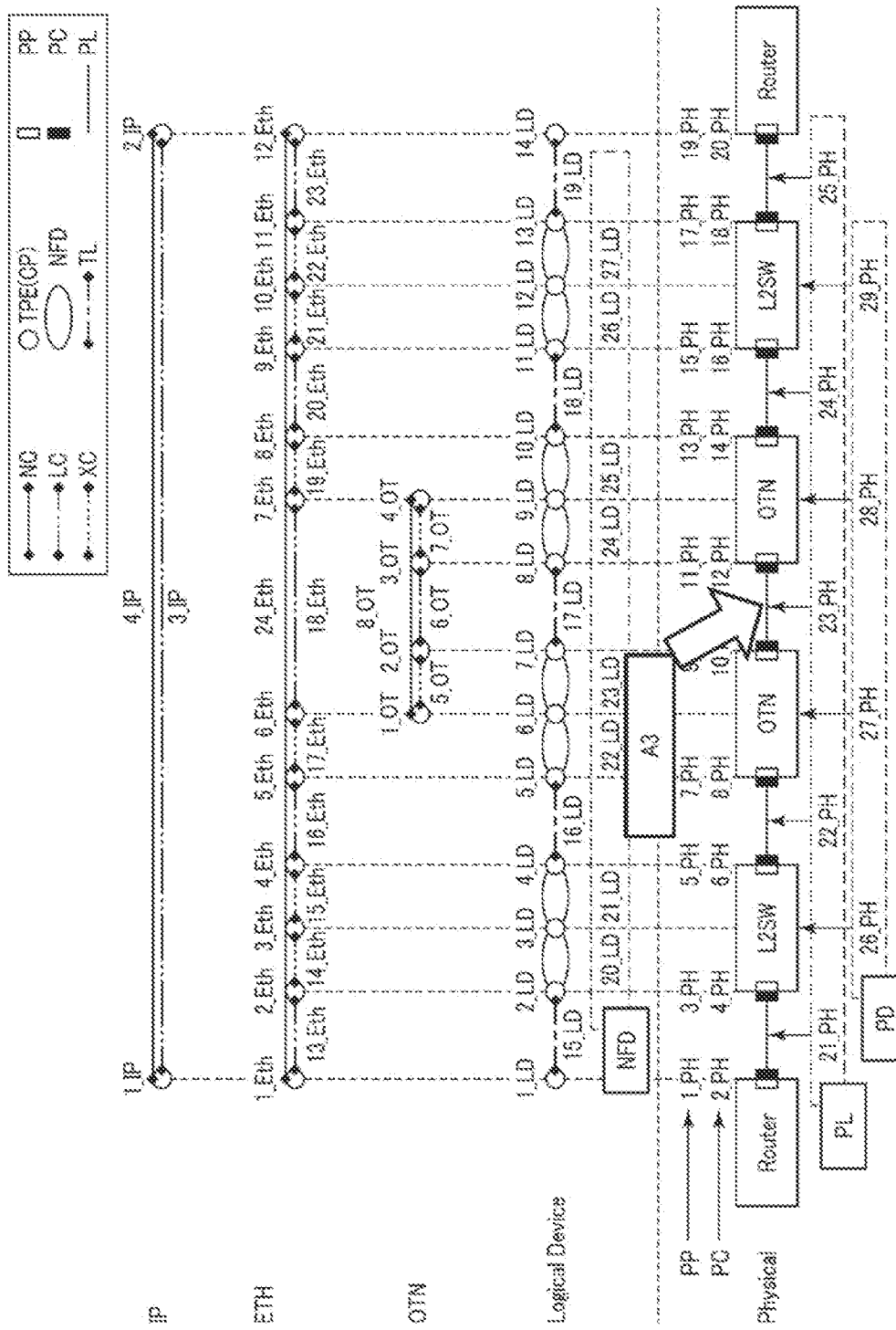
FIG. 26 is a diagram for explaining an example of designation of medium failure occurrence in Entities to be managed by a network management apparatus according to a fourth embodiment of the present invention.

First, identification and display of an influence range (in a case where a medium failure occurs) will be described. FIG. 26 is a diagram for explaining an example of designation of occurrence of a medium failure in Entities to be managed by a network management apparatus according to the fourth embodiment of the present invention.

In the example illustrated in FIG. 26, a user designates a medium between an OTN (first) and an OTN (second) (A3 in FIG. 26) as a place where a failure has occurred.

Figure 27:
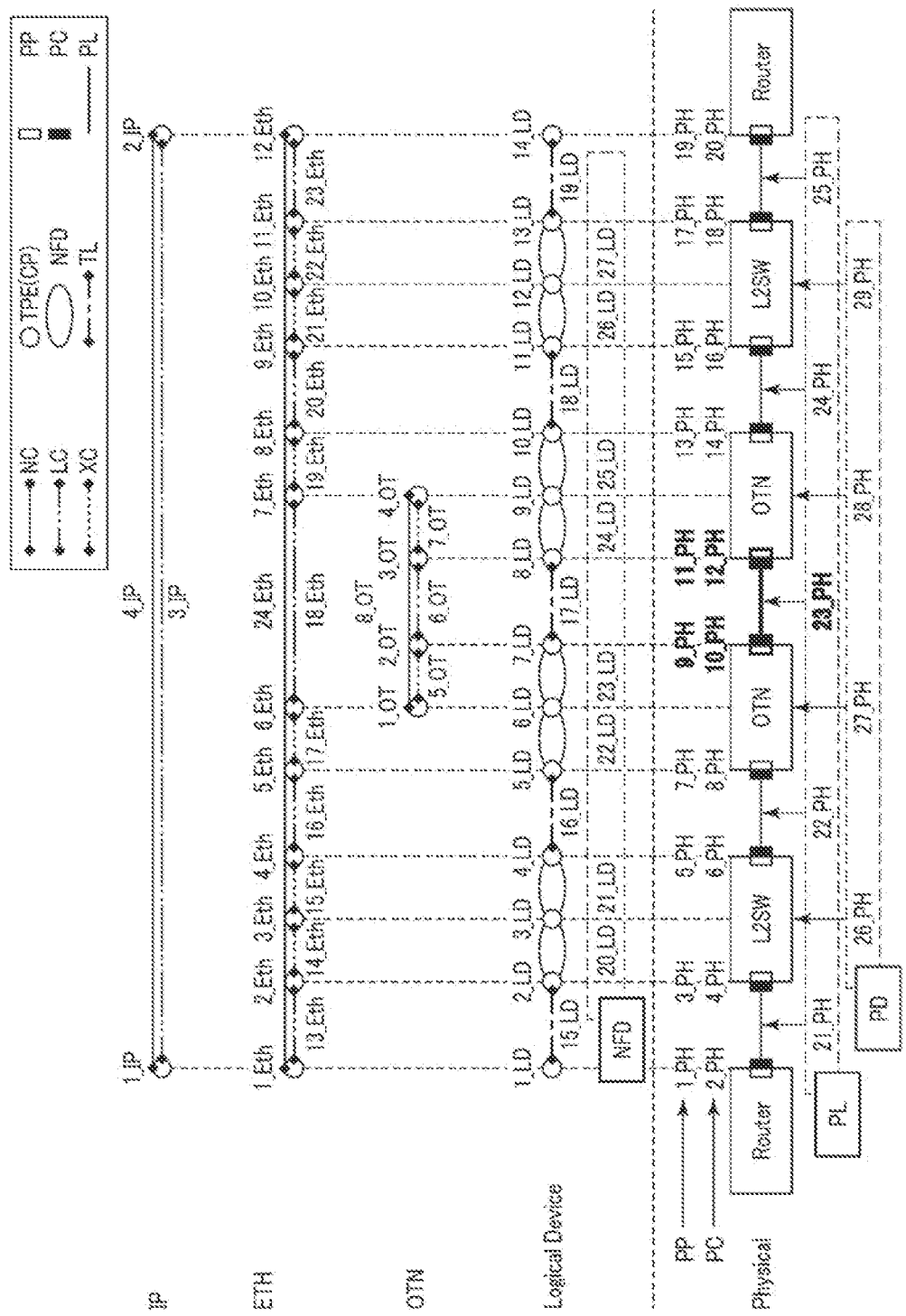
FIG. 27 is a diagram for explaining an example of an influence range in a Physical layer in Entities to be managed by the network management apparatus according to the fourth embodiment of the present invention.

Next, a method for identifying an influence range in a Physical layer will be described. FIG. 27 is a diagram for explaining an example of the influence range in the Physical layer in the Entities to be managed by the network management apparatus according to the fourth embodiment of the present invention.

In the example illustrated in FIG. 27, (1) a PL (communication cable which is the failure location) (23_PH) between the OTN (first) and the OTN (second) in the Physical layer, designated above, (2) PCs (both connectors of the communication cable) (10, 12_PHs), and (3) PPs (9, 11_PHs) of the OTN devices (first, second) are each identified as the influence range in this order. The PPs each correspond to a communication port of each of the OTN devices, the communication port being connectable to each of both connectors of the communication cable which is the failure location.

Figure 28:
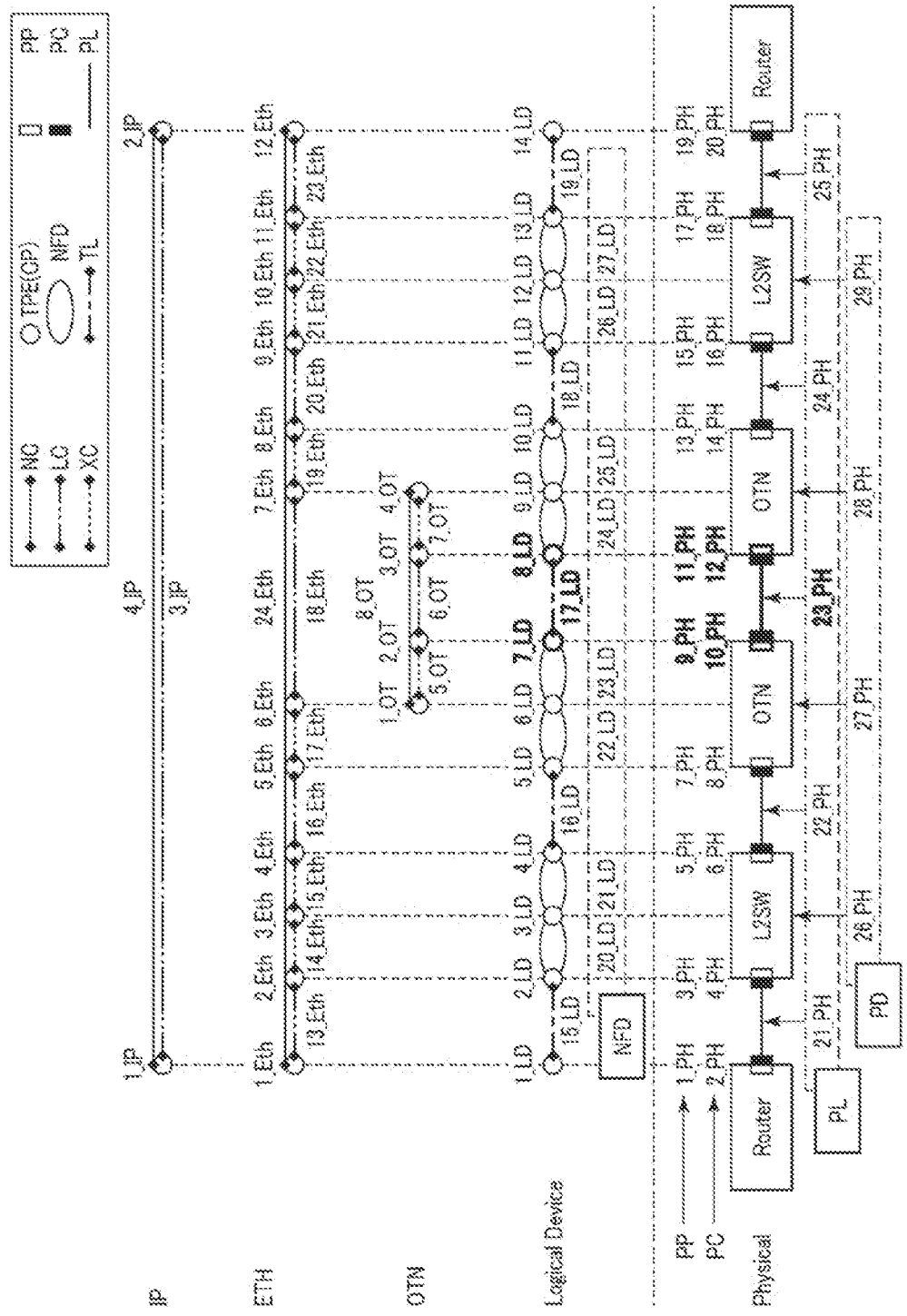
FIG. 28 is a diagram for explaining an example of an influence range in a Logical Device layer in Entities to be managed by the network management apparatus according to the fourth embodiment of the present invention.

Next, a method for identifying an influence range in a Logical Device layer will be described. FIG. 28 is a diagram for explaining an example of the influence range in the Logical Device layer in the Entities to be managed by the network management apparatus according to the fourth embodiment of the present invention.

In the example illustrated in FIG. 28, TPEs (7, 8_LDs), and a TL (17_LD) in the Logical Device layer, which are Entities corresponding to the influence range of the medium which is the failure location in the Physical layer, are each identified as the influence range.

Next, a method for identifying an influence range in an OTN layer will be described.

Figure 29:
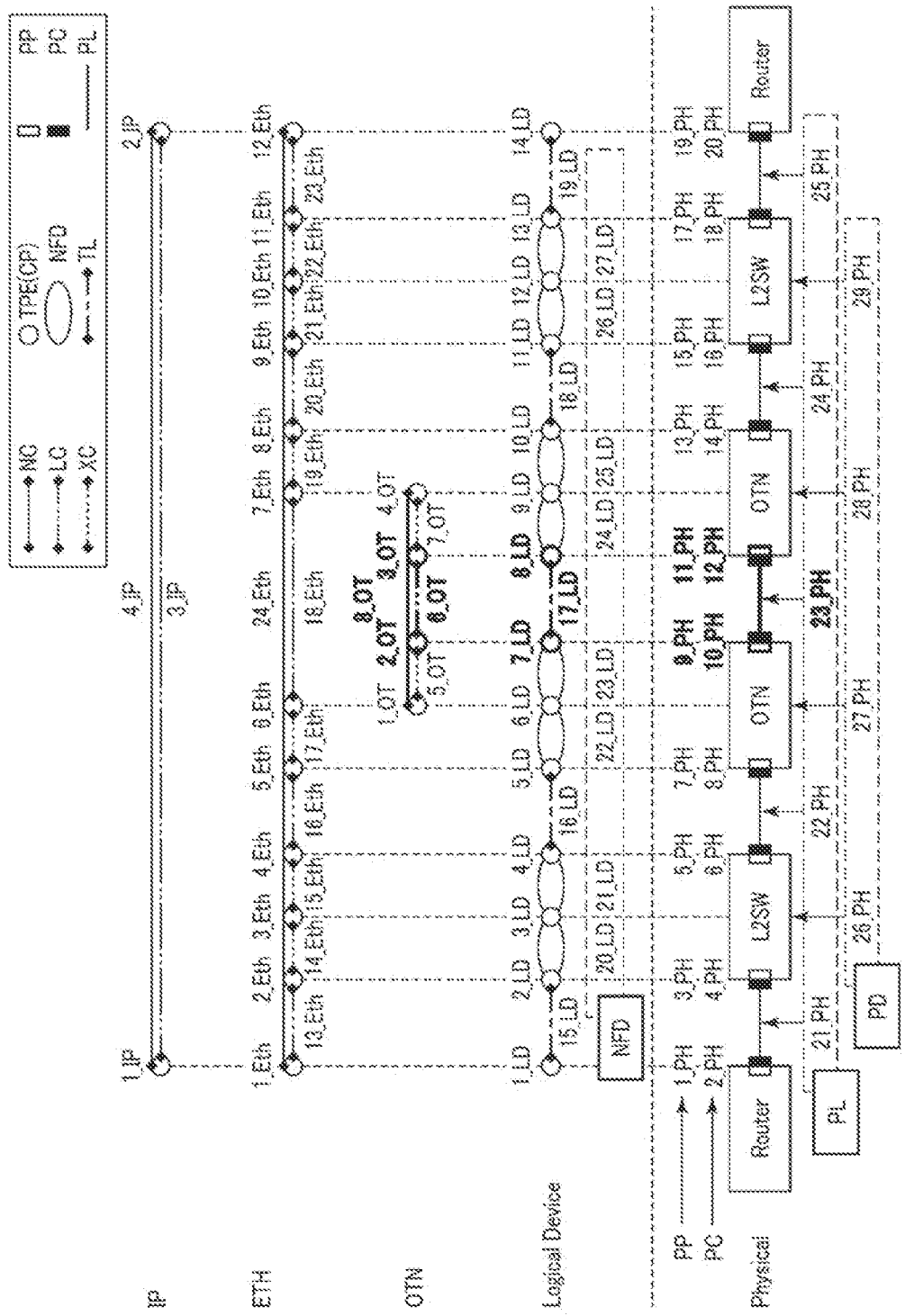
FIG. 29 is a diagram for explaining an example of an influence range in an OTN layer in Entities to be managed by the network management apparatus according to the fourth embodiment of the present invention.

FIG. 29 is a diagram for explaining an example of the influence range in the OTN layer in the Entities to be managed by the network management apparatus according to the fourth embodiment of the present invention.

In the example illustrated in FIG. 29, TPEs (2, 3_OT), an LC (6_OT), and an NC (8_OT) in the OTN layer, which are Entities corresponding to the TPEs (7, 8_LDs) and the TL (17_LD) in the Logical Device layer, are each identified as the influence range.

Figure 30:
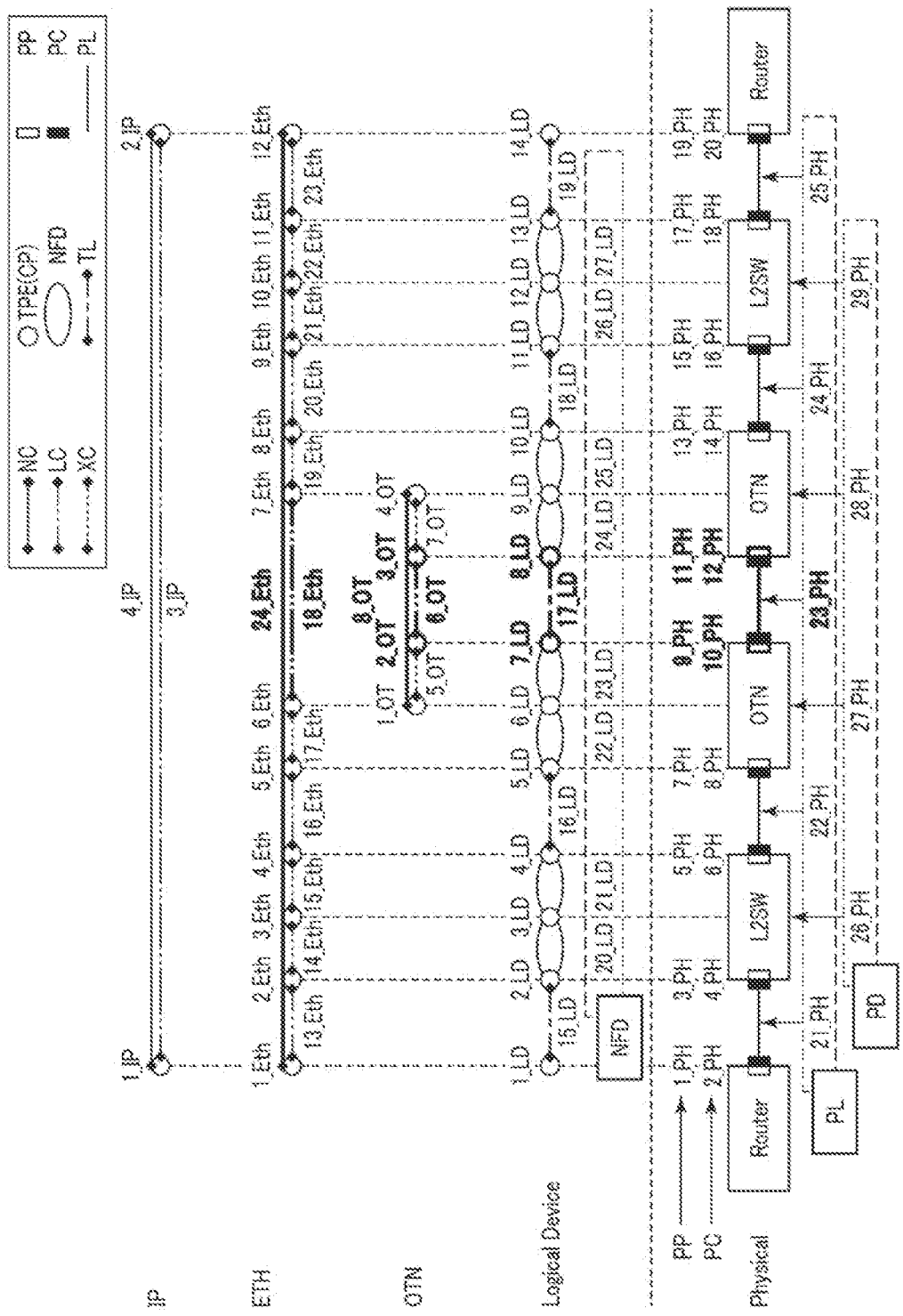
FIG. 30 is a diagram for explaining an example of an influence range in an ETH layer in Entities to be managed by the network management apparatus according to the fourth embodiment of the present invention.

Next, a method for identifying an influence range in an ETH layer will be described. FIG. 30 is a diagram for explaining an example of the influence range in the ETH layer in the Entities to be managed by the network management apparatus according to the fourth embodiment of the present invention.

In the example illustrated in FIG. 30, an LC (18_Eth) and an NC (24_Eth) in the ETH layer, which are Entities corresponding to the NC (8_OT) in the OTN layer are each identified as the influence range.

Figure 31:
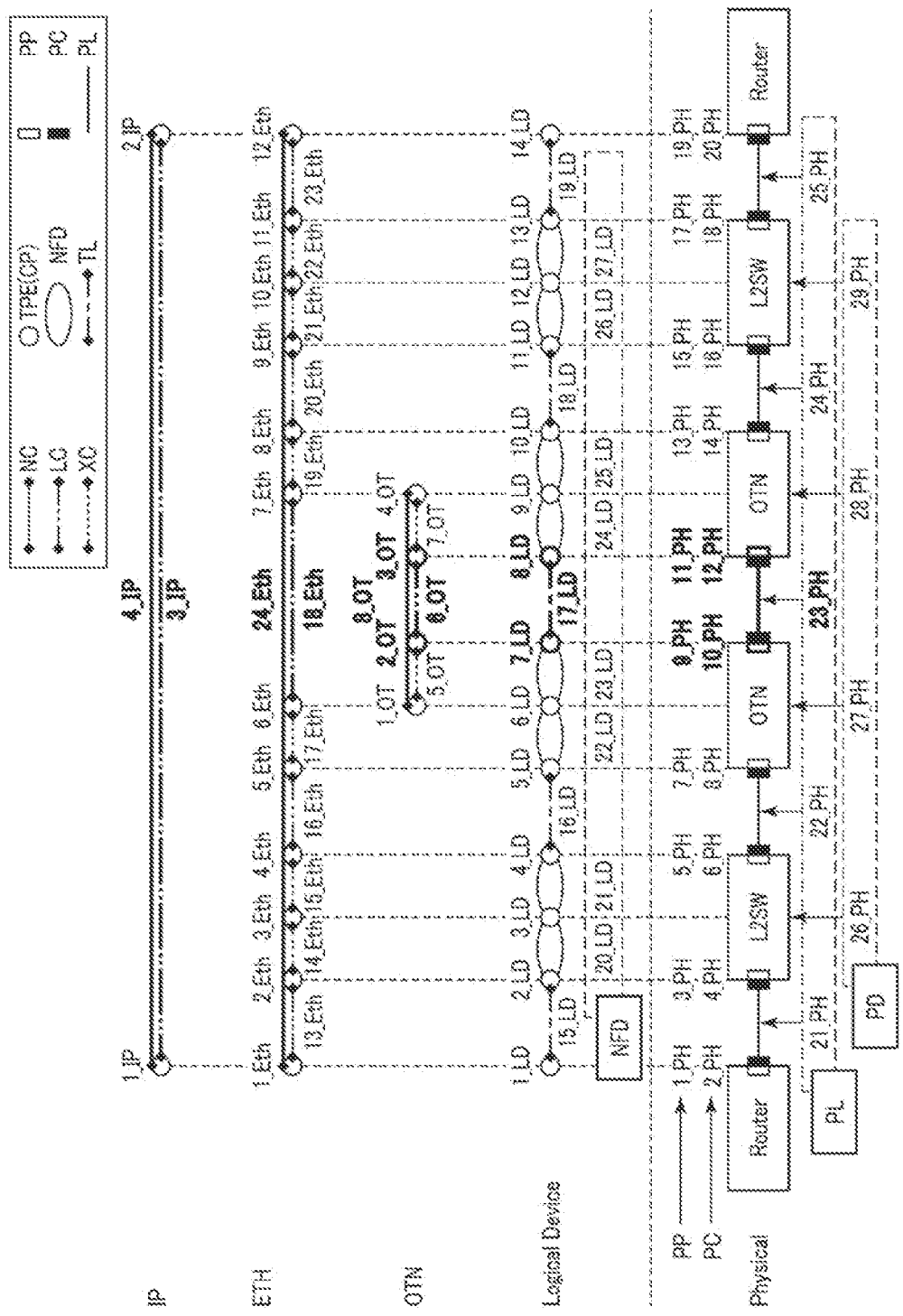
FIG. 31 is a diagram for explaining an example of an influence range in an IP layer in Entities to be managed by the network management apparatus according to the fourth embodiment of the present invention.

Next, a method for identifying an influence range in an IP layer will be described. FIG. 31 is a diagram for explaining an example of the influence range in the IP layer in the Entities to be managed by the network management apparatus according to the fourth embodiment of the present invention.

In the example illustrated in FIG. 31, an LC (3_IP) and an NC (4_IP) in the IP layer, which are Entities corresponding to the NC (24_Eth) in the ETH layer are each identified as the influence range.

Fifth Embodiment

Next, a fifth embodiment will be described. In this fifth embodiment, a functional overview of a failure influence grasping system implementing the network management apparatus will be described.

Figure 32:
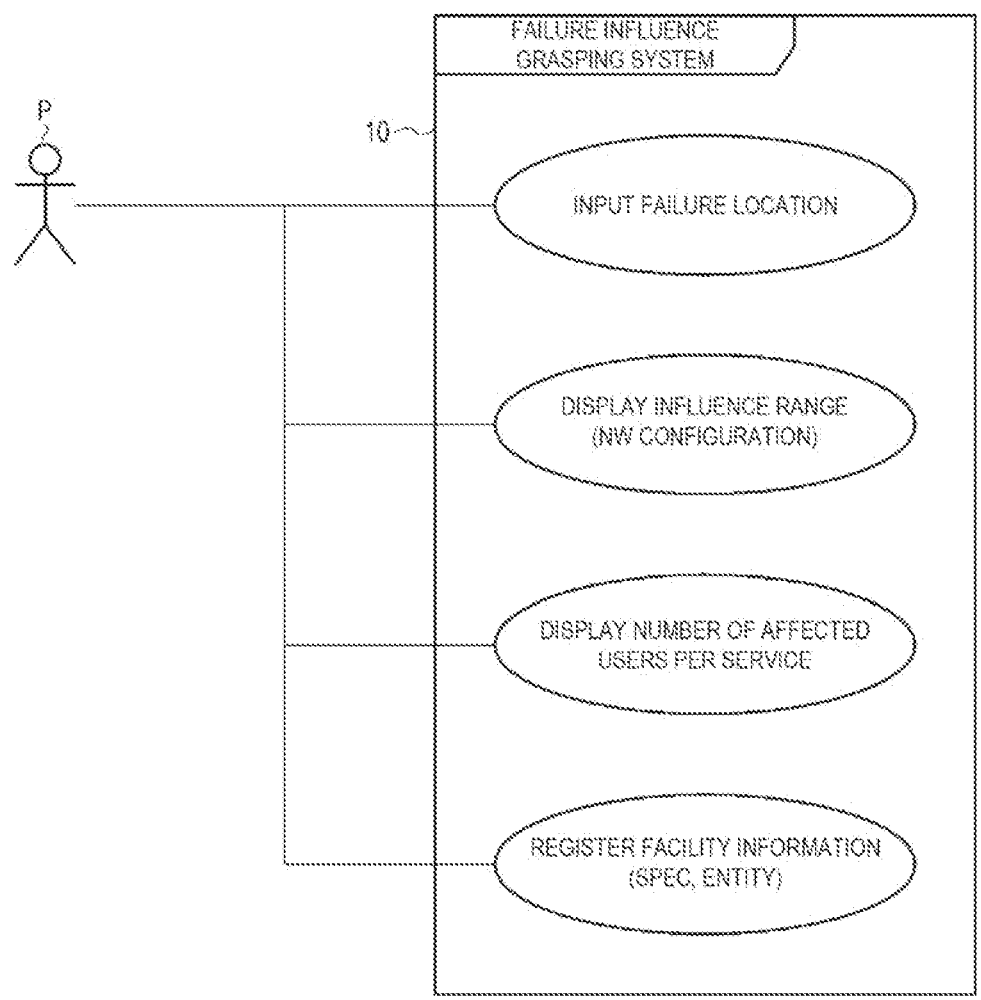
FIG. 32 is a diagram for explaining an example of a functional overview of a failure influence grasping system according to a fifth embodiment of the present invention.

FIG. 32 is a diagram for explaining an example of the functional overview of the failure influence grasping system according to the fifth embodiment of the present invention.

A failure influence grasping system 10 illustrated in FIG. 32 registers facility information (Spec (network characteristics), Entity (information object)). Once an operator p inputs information of a failure location, the failure influence grasping system 10 displays, on the display device, an image that indicates what location in the NW configuration (physical/logical layer) the failure location affects, and the number of affected users can also be displayed on the display device.

The affected user display may be achieved by displaying the attribute values of the communication object (NC) on the display device.

Next, a system configuration diagram of the failure influence grasping system will be described.

Figure 33:
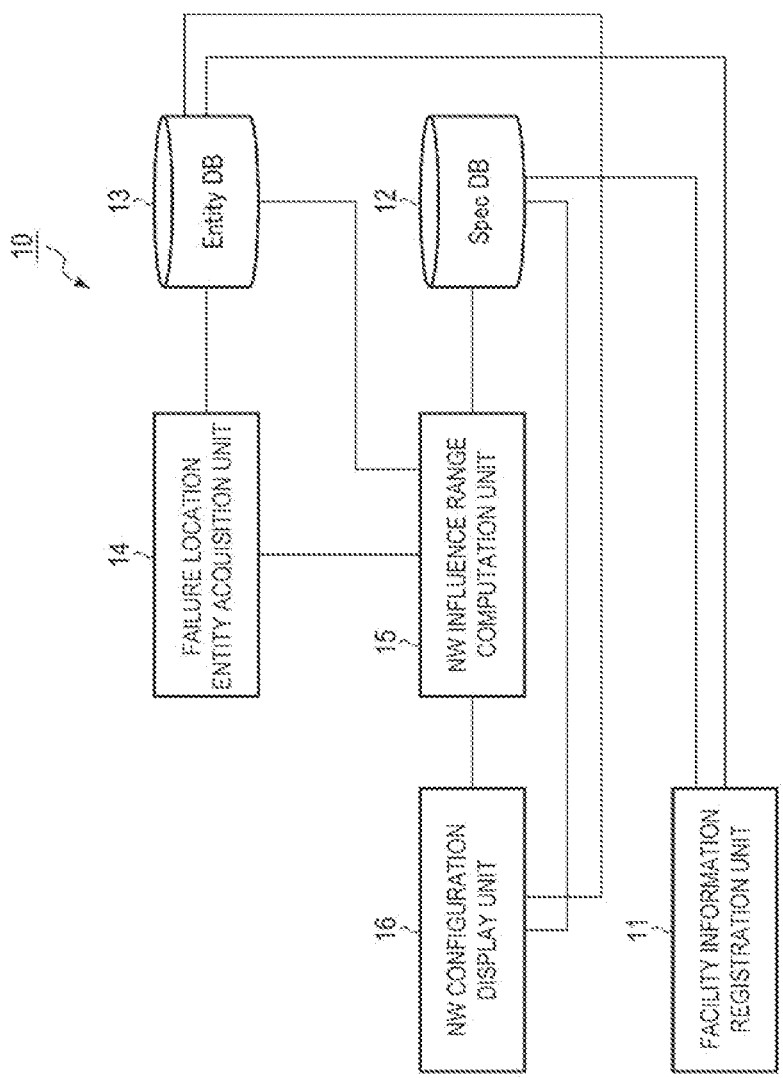
FIG. 33 is a diagram illustrating an example of a functional configuration of the failure influence grasping system according to the fifth embodiment of the present invention.

FIG. 33 is a diagram illustrating an example of a functional configuration of the failure influence grasping system according to the fifth embodiment of the present invention.

In the example illustrated in FIG. 33, the failure influence grasping system 10 can be configured as a computer that includes a central processing unit (CPU), a program memory, a computation memory, and the like. As illustrated in FIG. 33, the failure influence grasping system 10 has a facility information registration unit 11, a Spec database (DB) 12, an Entity DB 13, a failure location Entity acquisition unit 14, an NW influence range computation unit 15, and an NW configuration display unit 16, as the functions necessary to implement this embodiment. Processing thereof will be described below.

The facility information registration unit 11, the failure location Entity acquisition unit 14, the NW influence range computation unit 15, and the NW configuration display unit 16 may be implemented by causing the CPU to execute a program stored in the program memory. The Spec DB 12 and the Entity DB 13 may be implemented by a storage device such as a non-volatile memory. The NW configuration display unit 16 may be implemented by using a display device such as a liquid crystal display.

Note that the failure influence grasping system can be configured using hardware, but can be implemented by, for example, installing a program including a procedure illustrated in a flowchart to be described below to a known computer via a medium or a communication line, and combining the program-installed computer, the Spec DB 12 and the DB 13, or causing the program-installed computer to have the Spec DB 12 and the Entity DB 13. Details of the hardware configuration of the failure influence grasping system 10 will be described later.

Sixth Embodiment

Next, a sixth embodiment will be described. In this sixth embodiment, details of the failure influence grasping system will be described.

Figure 34:
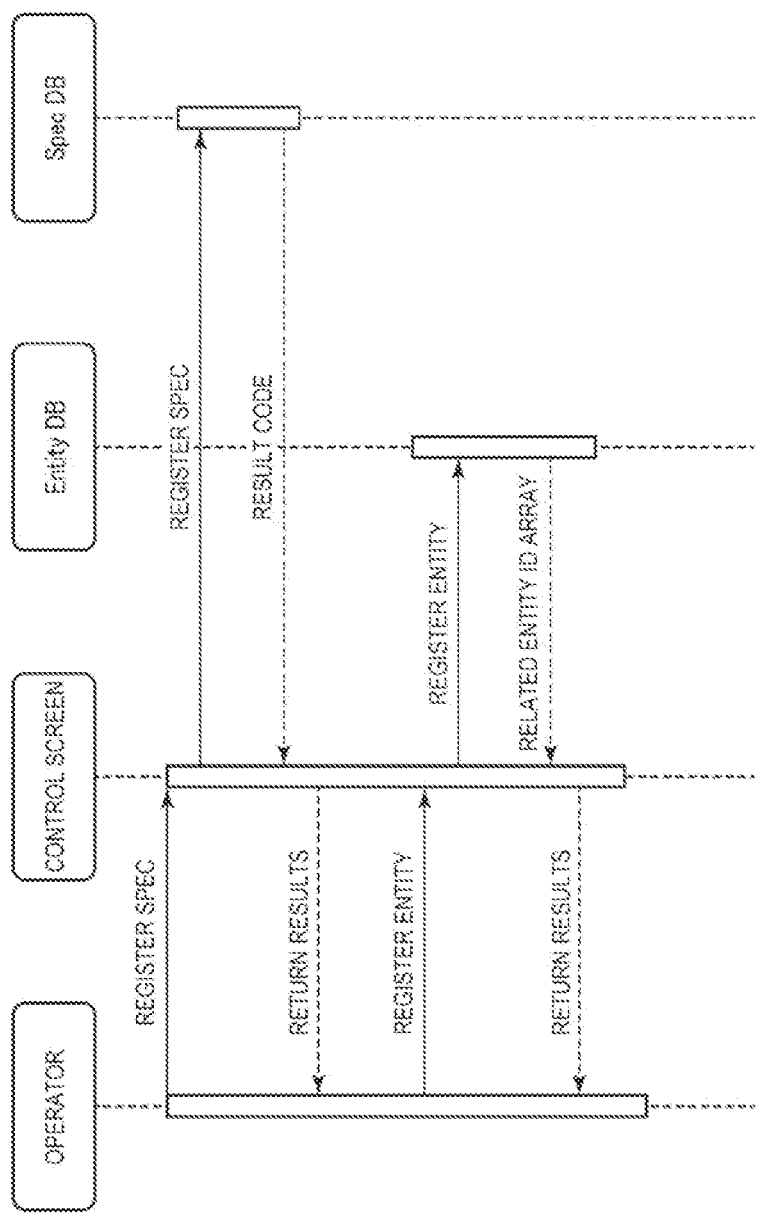
FIG. 34 is a sequence diagram illustrating an example of a procedure for registration of facility information by a failure influence grasping system according to a sixth embodiment of the present invention.

First, registration of facility information (Spec (Specification), Entity) will be described. FIG. 34 is a sequence diagram illustrating an example of a procedure for registration of facility information by a failure influence grasping system according to the sixth embodiment of the present invention.

First, when an operator registers facility information (Spec) on a control screen, the facility information (Spec) is registered in the Spec DB 12, a registration result code is returned to the control screen, and the registration result is returned to a display screen on the operator side.

Next, Specs (physical layer) of the facility information will be described. FIG. 35 is a diagram illustrating, in a tabular form, an example of the Specs (physical layer) of facility information held by the failure influence grasping system according to the sixth embodiment of the present invention.

In the physical layer, attributes that are unique information such as a device name or a cable type are held in the Spec DB 12 as information in which Spec (Specification) classes (defining attributes indicating characteristics) are instantiated. Specifically, the following Spec classes are defined.

These Specs are mainly utilized in the display of the NW configuration.

The "Spec name: meaning" in the physical layer is as follows.

PS Spec (Physical Structure Specification): defining a unique attribute for each PS PD Spec (Physical Device Specification): defining a unique attribute for each PD PP Spec (Physical Port Specification): defining a unique attribute for each PP AS Spec (Aggregate Section Specification): defining a unique attribute for each AS PL Spec (Physical Link Specification): defining a unique attribute for each PL PC Spec (Physical Connector Specification): defining a unique attribute for each PC Next, Specs (logical layer) of the facility information will be described. FIG. 36 is a diagram illustrating, in a tabular form, an example of the Specs (logical layer) of facility information held by the failure influence grasping system according to the sixth embodiment of the present invention.

In the logical layer, unique attributes for layers (VLAN ID (Virtual LAN IDentifier), IP address, wavelength number, etc.) are held in the Spec DB 12 as information in which each Spec class is instantiated. Specifically, the following Spec classes are defined.

Figure 37:
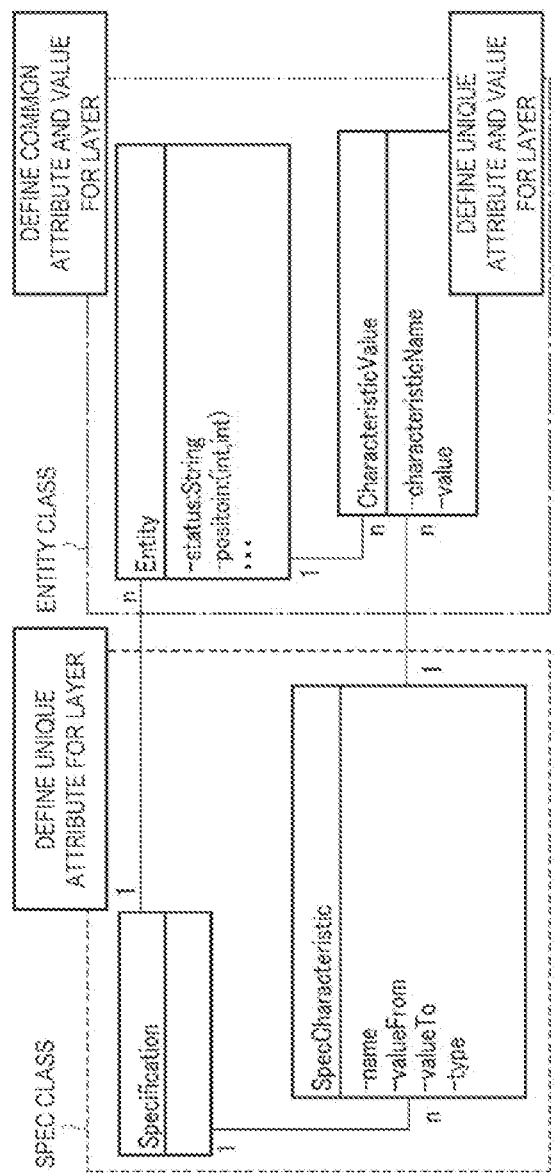
FIG. 37 is a diagram illustrating an example of use of a Spec class and an Entity class according to the failure influence grasping system according to the sixth embodiment of the present invention.

The "Spec name: meaning" in the logical layer is as follows:

TL Spec (Topological Link Specification): defining a unique attribute for each TL NFD Spec (Network Forwarding Domain Specification): defining a unique attribute for each NFD TPE Spec (Termination Point Encapsulation Specification): defining a unique attribute for each TPE NC Spec (Network Connection Specification): defining a unique attribute for each NC LC Spec (Link Connect Specification): defining a unique attribute for each LC XC Spec (Cross (X) Connect Specification): defining a unique attribute for each XC Next, a method of utilizing the Spec classes and the Entity classes (classes in which attribute values are defined) will be described. FIG. 37 is a diagram illustrating an example of utilization of the Spec and Entity classes by the failure influence grasping system according to the sixth embodiment of the present invention.

As illustrated in FIG. 37, attributes common to a layer and values thereof are held in the Entity DB 13 as the information in which the Entity class is instantiated (see, e.g., FIGS. 4 to 12). One Specification class in the Spec class is associated with n SpecCharacteristic classes and n Entity classes.

The SpecCharacteristic classes each include a name, a valueFrom, a valueTo, and a Type described below.

The Entity class includes "status: String" and "position (int, int)".

One Entity class is associated with n CharacteristicValue classes (external class of the Entity class, where a specific characteristic is stored, the specific characteristic being obtained by embodying any one of characteristics specified in the SpecCharacteristic classes).

The CharacteristicValue class includes a CharacteristicName and a Value described below.

The layer-specific attribute name is held in the pec DB 12 as information in which the SpecCharacteristic class (external class of Specification class) is instantiated (see e.g., FIGS. 35 and 36).

The layer-specific attribute value is held in the Spec DB 12 as information in which the CharacteristicValue class is instantiated. Note that the attribute name is defined by the SpecCharacteristic class.

Next, the schema of the Spec DB and the Entity DB will be described. FIG. 38 is a diagram illustrating, in a tabular form, an example of a schema of a Specificication table of facility information specified by the failure influence grasping system according to the sixth embodiment of the present invention.

The schema of the Specificication table held in the Spec DB12 (column name: type) is as follows (see SpecCharacteristic in FIG. 37).

Name: String
ValueFrom: int
ValueTo: int
Type: String

FIG. 39 is a diagram illustrating, in a tabular form, an example of a schema of an Entity table of facility information specified by the failure influence grasping system according to the sixth embodiment of the present invention.

The schema of the Entity table held in the Entity DB 13 (column name: type) is as follows (see CharacteristicValue in FIG. 37). The CharacteristicName is a corresponding SpecCharacteristic class name.

CharacteristicName: String
Value (specific value): String

Next, a method of registering the Specs will be described.

(1) The Specs of the facility information illustrated in FIGS. 35 and 36 are created as a table in the Spec DB 12 as the forms of Specification and SpecCharacteristic illustrated in FIG. 37. For example, the PS Spec illustrated in FIG. 35 is created by the SpecCharacteristic table illustrated in FIG. 37 being managed as a plurality of tables by an external key.

This SpecCharacteristic table includes four attributes (see FIG. 37) of a name (name of characteristic), a valueFrom (upper limit of specific value allowed by characteristic), a valueTo (lower limit of specific values allowed by characteristic), and a type (type of specific value of characteristic).

(2) An attribute required for a unique value in the logical layer to be stored in the Spec DB 12 is set to the name attribute of SpecCharacteristic (see FIG. 37).

(3) The type that sets this name attribute is set to the type attribute of SpecCharacteristic (see FIG. 37).

(4) When a precondition is required so that a value is set to the following attribute, this precondition is set to valueFrom and valueTo attributes of SpecCharacteristic (see FIG. 37). Here, the following attribute refers to an attribute required in order that a unique value in the logical layer is stored in the Spec DB 12.

Next, a method of registering Entities will be described.

(1) The attributes of the Entities described in FIGS. 4 to 12 are created in the Entity DB 13 as a table. For example, for the PD, PP, and PS Entities (see FIGS. 4 to 6), a table is created by a schema of two attributes including a state and a coordinate.

(2) A value common to the logical layer is stored in a record of the corresponding table in the Entity DB 13.

(3) In the attribute required to store a unique value in the logical layer, the following attribute name is set to the CharacteristicName attribute of the CharacteristicValue, and a value thereof is set to the value attribute of the CharacteristicValue (see FIG. 37). Here, the following attribute name refers to an attribute name set to the name attribute of the SpecCharacteristic of the corresponding Spec.

Seventh Embodiment

Next, a seventh embodiment will be described. In this seventh embodiment, input of a failure location and the like will be described.

Figure 40:
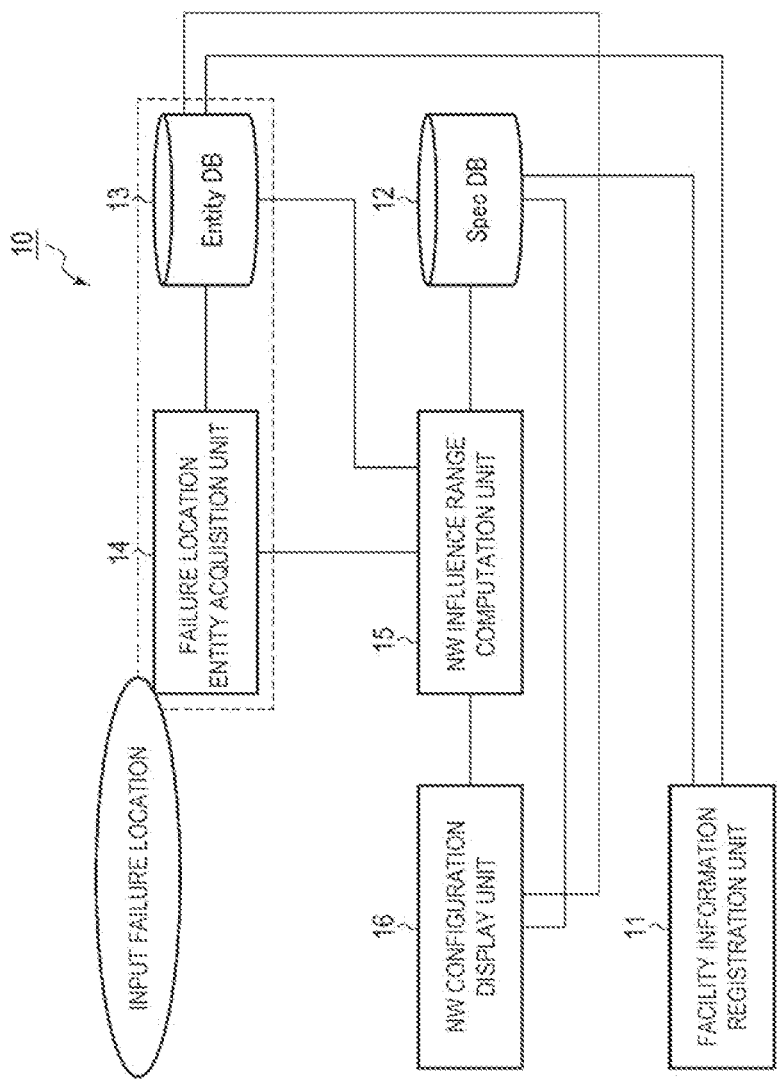
FIG. 40 is a diagram illustrating an example of components that function in input of a failure location in a failure influence grasping system according to a seventh embodiment of the present invention.

First, input of a failure location (a correspondence relationship between use case and a function unit) will be described. FIG. 40 is a diagram illustrating an example of components that function in input of a failure location in a failure influence grasping system according to the seventh embodiment of the present invention.

As illustrated in FIG. 40, in the input of a failure location (see FIG. 32), the facility information registration unit 11 and the Entity DB 13 function.

Next, processing of the failure location Entity acquisition unit 14 will be described.

(1) The failure location Entity acquisition unit 14 can designate a failure location in response to an operation on an input device such as a keyboard or mouse from a user, for example, in a display screen of a network configuration.

(2) A drawing object corresponding to the failure location among drawing objects of a building, a cable, and a device on a display screen is designated.

(3) The failure location Entity acquisition unit 14 acquires an Entity name from the drawing object of the designated failure location.

(4) The failure location Entity acquisition unit 14 accesses the Entity DB 13 using the acquired Entity name, and acquires an Entity, which is the failure location.

Eighth Embodiment

Next, an eighth embodiment will be described. In this eighth embodiment, display of an influence range will be described.

Figure 41:
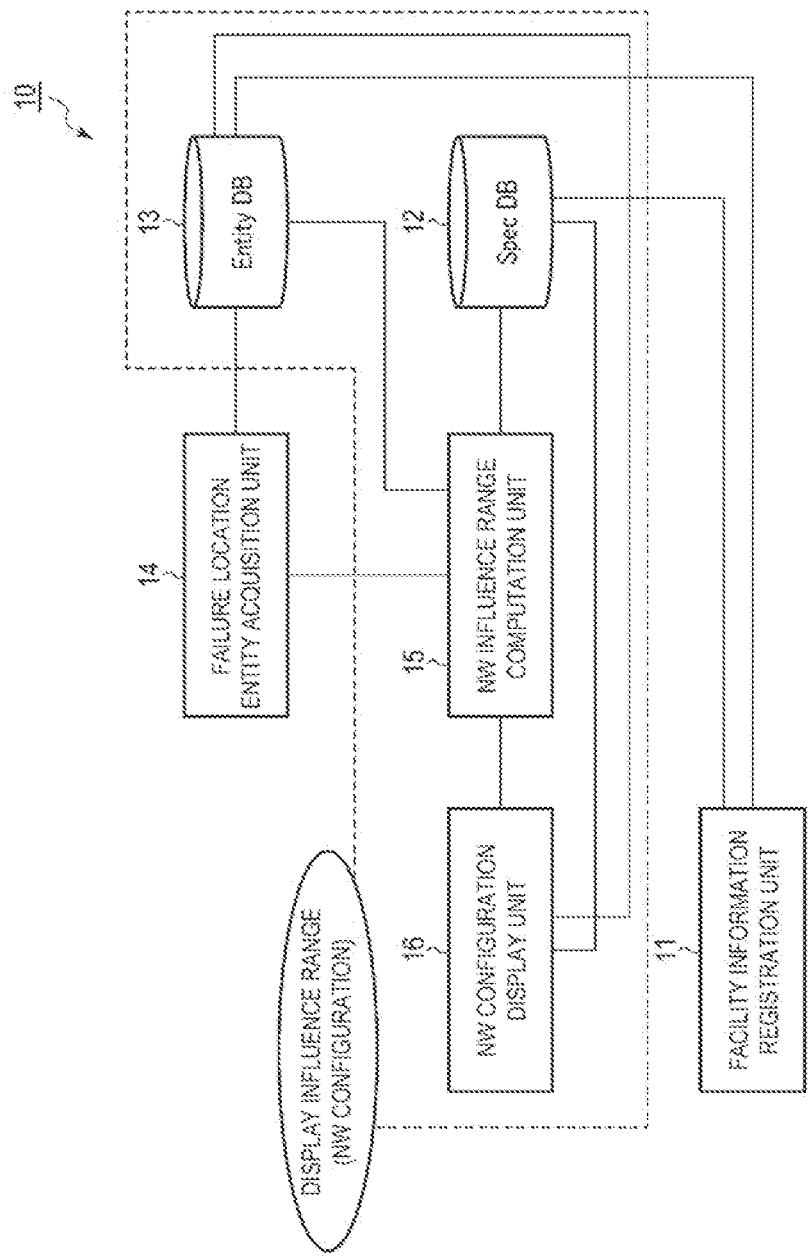
FIG. 41 is a diagram illustrating an example of components that function in display of an influence range in a failure influence grasping system according to an eighth embodiment of the present invention.

First, a method of displaying an influence range (a correspondence relationship between a use case and a function unit) will be described. FIG. 41 is a diagram illustrating an example of components that function for displaying an influence range in a failure influence grasping system according to the eighth embodiment of the present invention.

As illustrated in FIG. 41, in displaying an influence range (NW configuration) (see FIG. 32), the Spec DB 12, the Entity DB 13, the NW influence range computation unit 15, and the NW configuration display unit 16 function.

Figure 42:
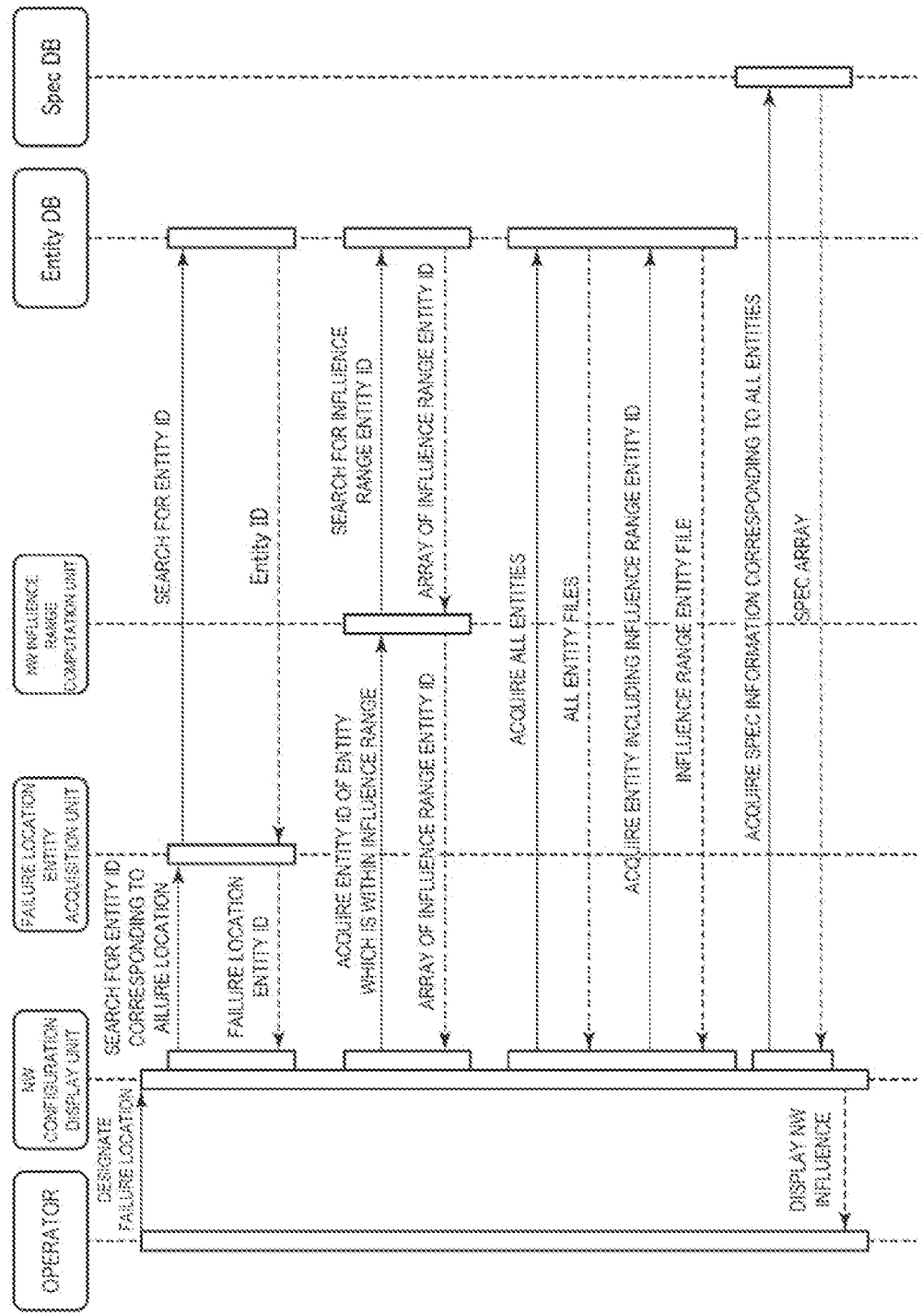
FIG. 42 is a sequence diagram illustrating an example of processing operations for the display of an influence range by the failure influence grasping system according to the eighth embodiment of the present invention.

Next, a sequence related to the display of the influence range will be described. FIG. 42 is a sequence diagram illustrating an example of a processing procedure for displaying the influence range by the failure influence grasping system according to the eighth embodiment of the present invention.

First, when an operator designates a failure location on a display screen in the NW configuration, the NW configuration display unit 16 searches for an Entity ID corresponding to the failure location from the Entity DB 13 using the failure location Entity acquisition unit 14. This Entity ID is returned to the NW configuration display unit 16 as the failure location Entity ID.

The NW configuration display unit 16 instructs the NW influence range computation unit 15 to acquire an influence range Entity ID that indicates an influence range due to the failure indicated by the failure location Entity ID. The NW influence range computation unit 15 then searches for the influence range Entity ID from the Entity DB 13. The array of the searched influence range Entity ID is returned to the NW configuration display unit 16.

The NW configuration display unit 16 then acquires all Entities from the Entity DB 13. The NW configuration display unit 16 acquires the Entities including the acquired influence range Entity ID as an influence range Entity file from the Entity DB 13. The NW configuration display unit 16 acquires Spec information corresponding to all Entities as a Spec array from the Spec DB 12. Each of the acquired results by the NW configuration display unit 16 is displayed on a display screen of NW influence to be grasped by the operator.

Figure 43A:
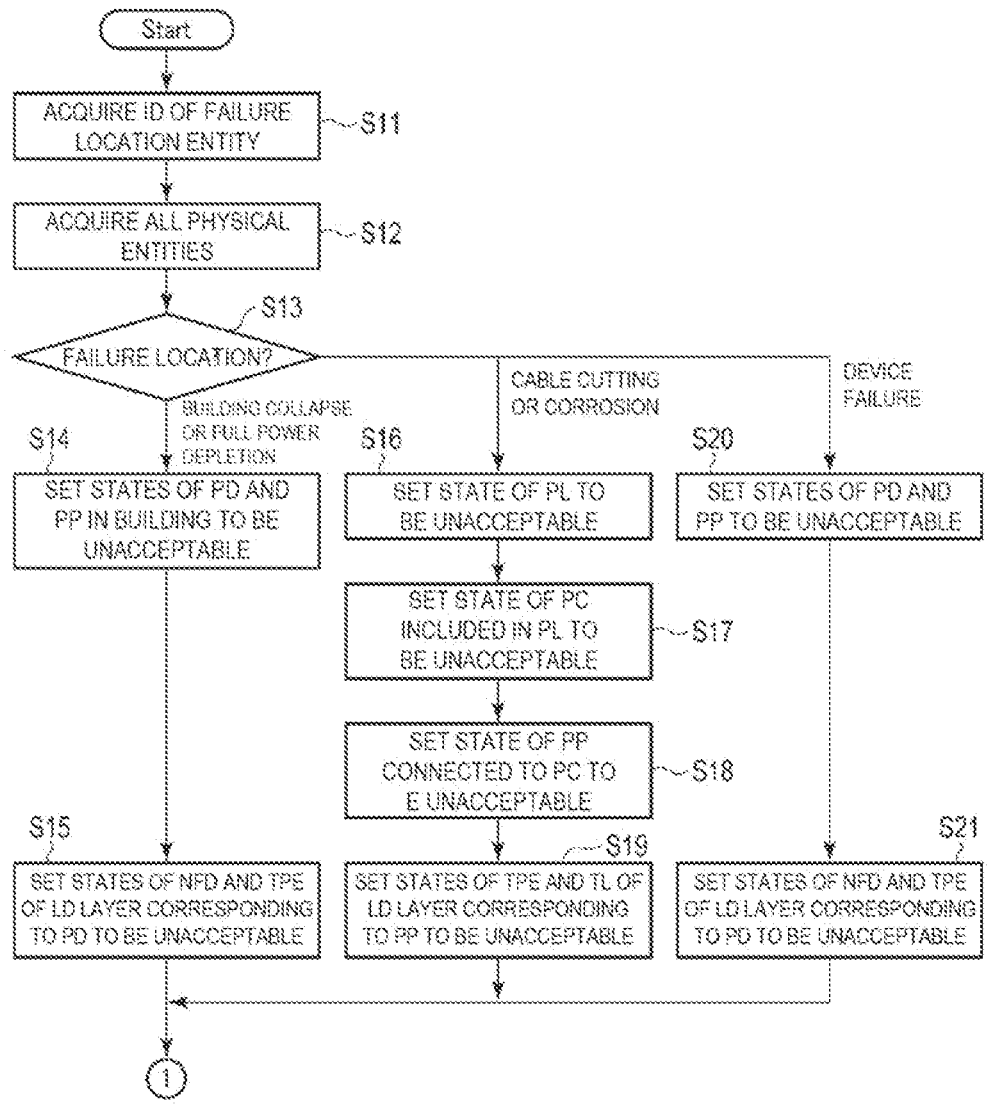
FIG. 43A is a flowchart illustrating an example of processing operations of an NW influence range computation unit of the failure influence grasping system according to the eighth embodiment of the present invention.
Figure 43B:
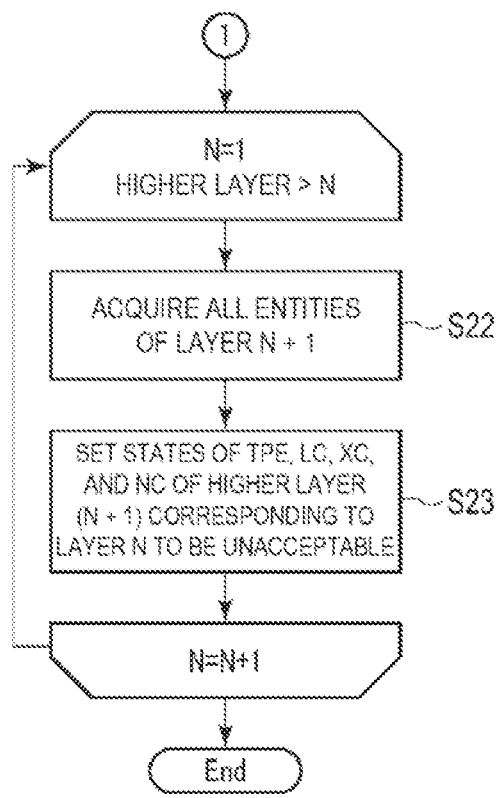
FIG. 43B is a flowchart illustrating an example of processing operations of the NW influence range computation unit of the failure influence grasping system according to the eighth embodiment of the present invention.

Next, processing by the NW influence range computation unit 15 will be described. FIGS. 43A and 43B are flowcharts each illustrating an example of a processing procedure performed by the NW influence range computation unit 15 of the failure influence grasping system according to the eighth embodiment of the present invention.

First, the NW influence range computation unit 15 acquires a failure location Entity ID from the Entity DB 13 (S11) and acquires all Entities of the physical layer from the Entity DB 13 (S12).

The NW influence range computation unit 15 recognizes the failure location indicated by the failure location Entity ID (S13). When the failure location indicates a location indicating collapse of a building or full depletion of power source in the building (full power depletion), the NW influence range computation unit 15 sets states of PD and PP in the building to be unacceptable (failure) (S14) and set the states of NFD and TPE of the Logical Device layer to be unacceptable (S15), the NFD and TPE being Entities corresponding to the PD.

Alternatively, when the failure location is a location indicating cable cutting or corrosion, the NW influence range computation unit 15 sets a state of PL to be unacceptable (S16), sets a state of PC included in the PL to be unacceptable (S17), sets a state of PP connected to the PC to be unacceptable (S18), and sets states of TPE and TL in the Logical Device layer to be unacceptable (S19), the TPE and TL being Entities corresponding to the PP.

Alternatively, when the failure location is a location indicating a device failure, the NW influence range computation unit 15 sets states of PD and PP to be unacceptable (S20), and sets states of NFD and TPE in the Logical Device layer to be unacceptable (S21), the NFD and the TPE being Entities corresponding to PD.

After S15, 19 or 21, the NW influence range computation unit 15 sets the initial value of N to 1. The NW influence range computation unit 15 then acquires all Entities of a layer (N+1), which is a higher layer of the Logical Device layer, from the Entity DB 13, with the condition that N is less than the number of higher layers of the Logical Device layer (S22). Then, the NW influence range computation unit 15 sets states of TPE, LC, XC, and NC of the higher layer (N+1) corresponding to the layer N to be unacceptable (S23). After this setting, the NW influence range computation unit 15 adds one to N to perform update, and S22 and S23 are repeated (loop) until N becomes greater than or equal to the number of higher layers of the Logical Device layer.

Figure 44:
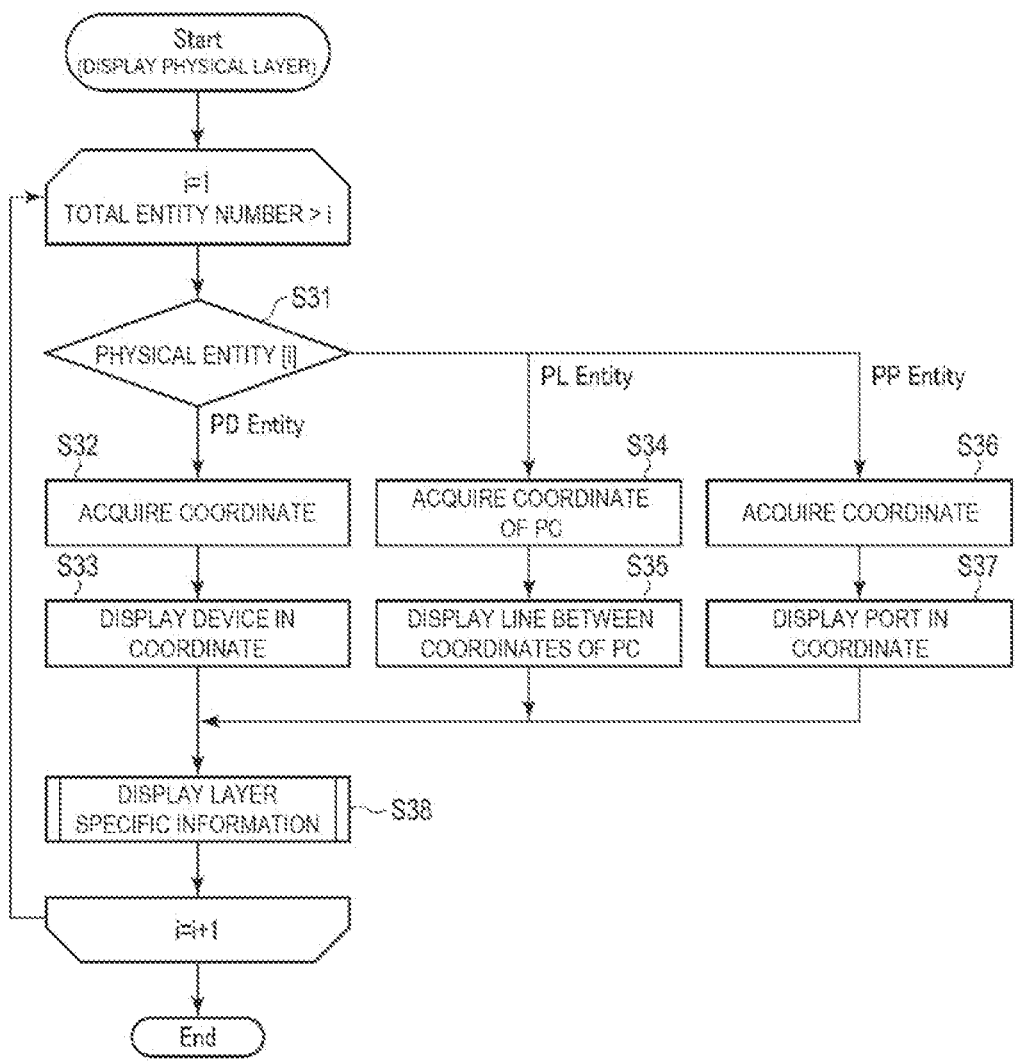
FIG. 44 is a flowchart illustrating an example of a procedure for displaying a physical layer configuration by an NW configuration display unit of the failure influence grasping system according to the eighth embodiment of the present invention.

The display of the influence range in the NW configuration will now be described. FIG. 44 is a flowchart illustrating an example of a procedure for displaying physical layer configuration by the NW configuration display unit 16 of the failure influence grasping system according to the eighth embodiment of the present invention.

First, the NW configuration display unit 16 sets the initial value of i to 1, and recognizes a type of Entity [i] in the physical layer, with the condition that i is less than the number of all Entities (S31).

When the type of Entity [i] is the PD Entity, the NW configuration display unit 16 acquires a coordinate (see FIG. 5) defined by the PD Entity from the Entity DB 13 (S32) and displays a drawing object of a device at a position corresponding to the coordinate (S33).

When the type of Entity [i] is the PL Entity, the NW configuration display unit 16 acquires coordinates of the PCs at both ends of the corresponding PL (corresponding to the coordinates of PPs (see FIG. 6) defined in the PP Entity) from the Entity DB 13 (S34), and displays a drawing object of a line between the coordinates (S35).

When the type of Entity [i] is the PP Entity, the NW configuration display unit 16 acquires a coordinate (see FIG. 6) defined in the PP Entity from the Entity DB 13 (S36) and displays a drawing object of a port at a position corresponding to the coordinate (S37).

After S33, 35 or S37, the NW configuration display unit 16 performs display processing of information specific to the layer (S38). Details of S38 will be described below. After processing of S38, the NW configuration display unit 16 adds one to i to perform update, and S31 to 38 loop until this i becomes the number of all Entities. Note that drawing based on coordinate information of an object is also described in Non Patent Literature 1 and JP 2019-149774.

Figure 45:
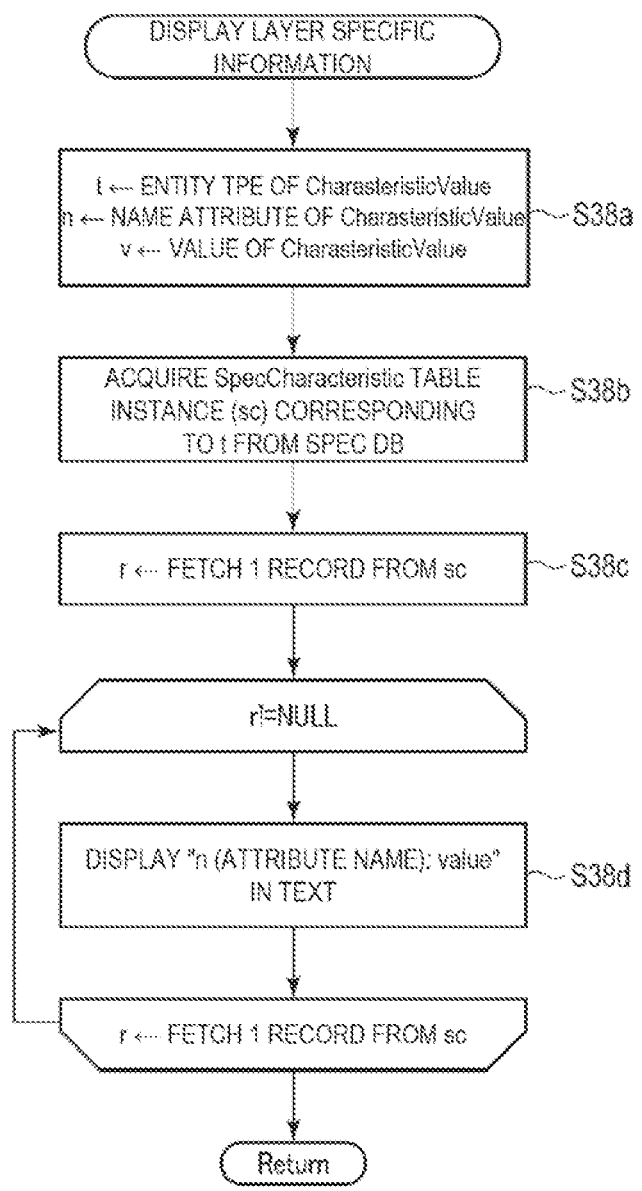
FIG. 45 is a flowchart illustrating an example of a procedure for displaying information unique to a layer by the NW configuration display unit of the failure influence grasping system according to the eighth embodiment of the present invention.

Next, display of information specific to a layer will be described. FIG. 45 is a flowchart illustrating an example of a procedure for displaying layer-specific information by the NW configuration display unit 16 of the failure influence grasping system according to the eighth embodiment of the present invention.

First, the NW configuration display unit 16 stores an Entity type of CharacteristicValue in a variable t, stores a CharacteristicName attribute of CharacteristicValue in a variable n, and stores a value attribute of CharacteristicValue in a variable v (S38a).

The NW configuration display unit 16 acquires a Spec-Characteristic table instance (sc) corresponding to t from the Spec DB12 (S38b).

The NW configuration display unit 16 retrieves one record from sc and stores it in the variable r (S38c).

The NW configuration display unit 16 starts a loop of r!=NULL and displays "n (attribute name): value (v)" on the display screen in text (S38d). The NW configuration display unit 16 retrieves one record from sc, stores it in the variable r, and returns to the beginning of the loop.

Figure 46:
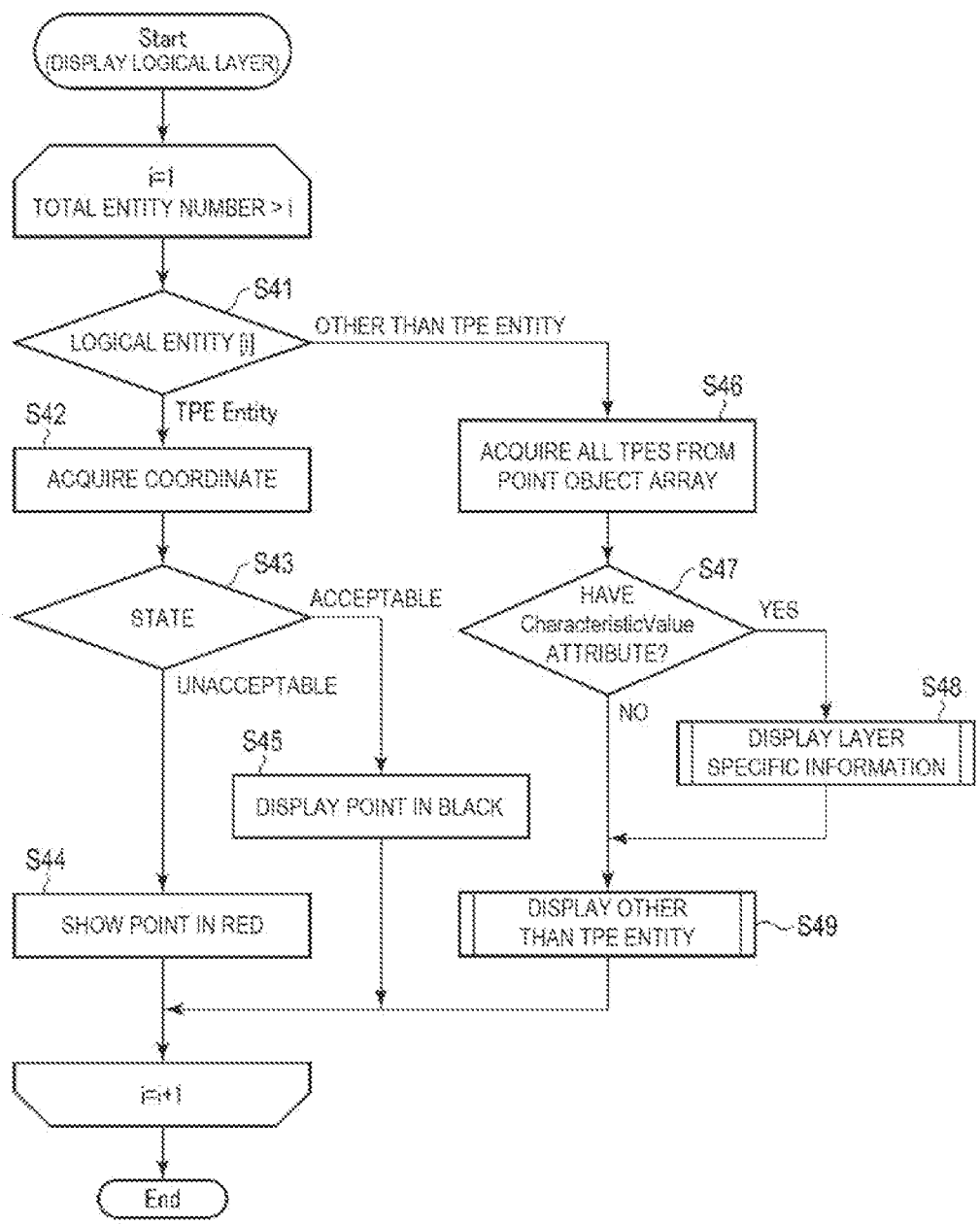
FIG. 46 is a flowchart illustrating an example of a procedure for displaying a logical layer configuration by the NW configuration display unit of the failure influence grasping system according to the eighth embodiment of the present invention.

Next, display of the configuration of the logical layer will be described. FIG. 46 is a flowchart illustrating an example of a procedure for displaying the configuration of the logical layer by the NW configuration display unit 16 of the failure influence grasping system according to the eighth embodiment of the present invention.

First, the NW configuration display unit 16 sets the initial value of i to 1, and recognizes a type of Entity [i] of the logical layer, with the condition that i is less than the number of all Entities (S41).

When the type of Entity [i] is the TPE Entity, the NW configuration display unit 16 acquires a coordinate defined by the TPE Entity (see FIG. 11) from the Entity DB 13 (S42) and recognizes a state defined by the TPE Entity (S43).

When the state is set to be unacceptable by the NW influence range computation unit 15, the NW configuration display unit 16 displays a point corresponding to the acquired coordinate in red (S44), and when the state is not set to be unacceptable, the NW configuration display unit 16 displays a point corresponding to the acquired coordinate in black (S45).

When the type of Entity [i] is other than the TPE Entity, the NW configuration display unit 16 acquires all TPEs from a point object array defined in the Entity DB 13 (S46) and recognizes whether there is a CharacteristicValue attribute in the TPEs (S47).

When there is a CharacteristicValue attribute, the NW configuration display unit 16 performs display processing of information specific to the layer, as described above (see FIG. 45) (S48).

After S48, or when there is no CharacteristicValue attribute, the NW configuration display unit 16 performs display processing of an Entity other than the TPE Entity (S49). After processing of S48 or S49, the NW configuration display unit 16 adds 1 to i to perform update, and the S41 to S49 loops until this i is the number of all Entities. The display processing of an Entity other than the TPE Entity will be described later.

Figure 47A:
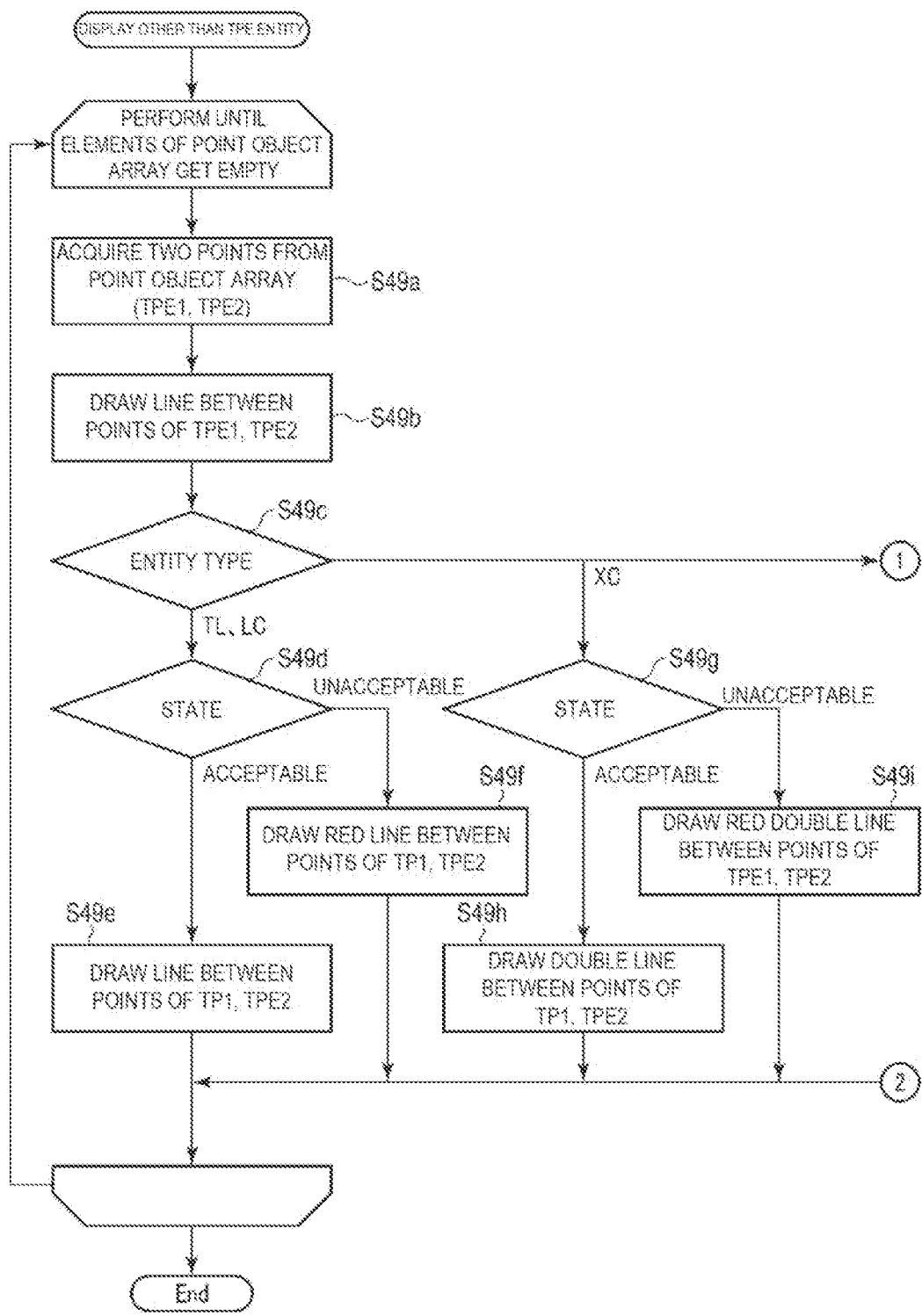
FIG. 47A is a flowchart illustrating an example of a procedure for display other than TPE by the NW configuration display unit of the failure influence grasping system according to the eighth embodiment of the present invention.
Figure 47B:
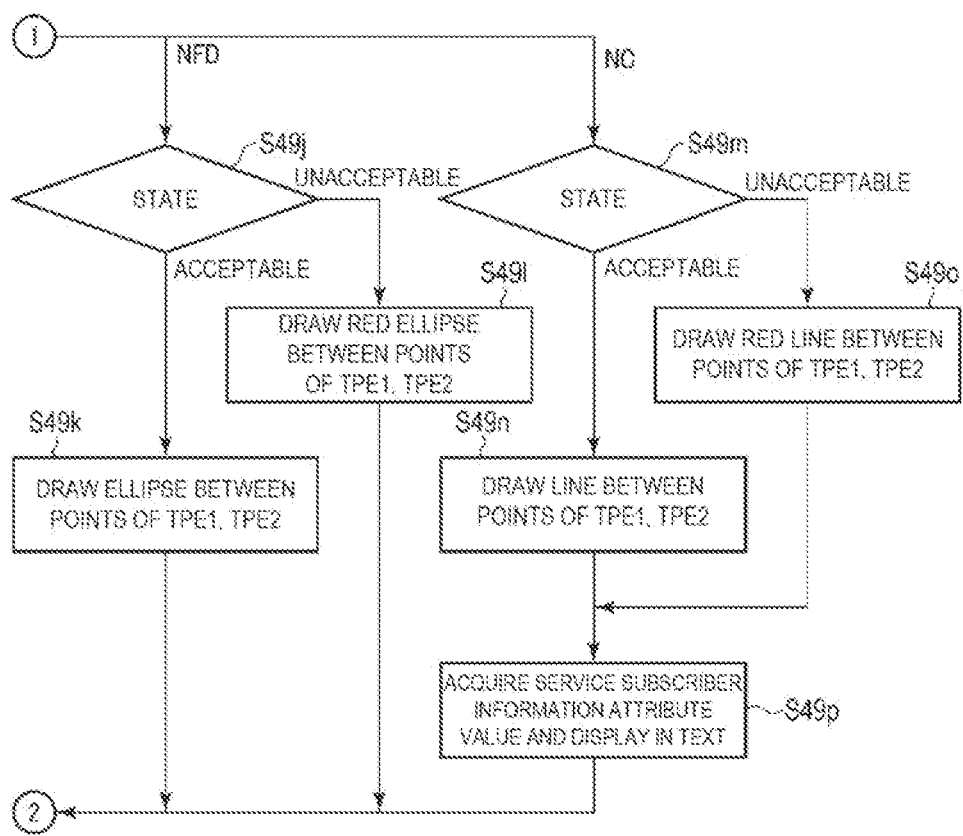
FIG. 47B is a flowchart illustrating an example of the procedure for display other than TPE by the NW configuration display unit of the failure influence grasping system according to the eighth embodiment of the present invention.

The display of an Entity other than TPE will now be described. FIGS. 47A and 47B are flowcharts each illustrating an example of a procedure for displaying an Entity other than TPE by the NW configuration display unit 16 of the failure influence grasping system according to the eighth embodiment of the present invention.

First, the NW configuration display unit 16 initiates a loop of "perform until elements of the point object array get empty" and acquires coordinates of two points (TPE1, TPE2) from the point object array defined in the Entity DB 13 (S49a), and adds a drawing object of a line between the acquired TPE1 and TPE2 (S49b).

The NW configuration display unit 16 recognizes a type of an Entity between the acquired TPE1 and TPE2 from the Entity DB 13 (S49c).

When the type of Entity is TL or LC, the NW configuration display unit 16 recognizes a state defined in this Entity (S49d).

When this state is set to not be unacceptable by the NW influence range computation unit 15, the NW configuration display unit 16 adds a drawing object of a non-red line, e.g., a black line, between points corresponding to TPE1 and TPE2 (S49e).

On the other hand, when the state is set to be unacceptable by the NW influence range computation unit 15, the NW configuration display unit 16 adds a drawing object of a red line between the points corresponding to TPE1 and TPE2 (S49f).

When the type of Entity is XC, the NW configuration display unit 16 recognizes a state defined in this Entity (S49g).

When this state is set to be acceptable by the NW influence range computation unit 15, the NW configuration display unit 16 adds a drawing object of a non-red double line, e.g., a black double line, between points corresponding to TPE1 and TPE2 (S49h).

On the other hand, when the state is set to be unacceptable by the NW influence range computation unit 15, the NW configuration display unit 16 adds a drawing object of a red double line between points corresponding to TPE1 and TPE2 (S49i).

When the type of Entity is NFD, the NW configuration display unit 16 recognizes a state defined in this Entity (S49j).

When this state is set to be acceptable by the NW influence range computation unit 15, the NW configuration display unit 16 adds a drawing object of a non-red ellipse, e.g., a black ellipse, between points corresponding to TPE1 and TPE2 (S49k).

On the other hand, when the state is set to be unacceptable by the NW influence range computation unit 15, the NW configuration display unit 16 adds a drawing object of a red ellipse between points corresponding to TPE1 and TPE2 (S49l).

When the type of Entity is NC, the NW configuration display unit 16 recognizes a state defined in this Entity (S49m).

When this state is set to be acceptable by the NW influence range computation unit 15, the NW configuration display unit 16 adds a drawing object of a non-red line, e.g., a black line, between points corresponding to TPE1 and TPE2 (S49n).

On the other hand, when the state is set to be unacceptable by the NW influence range computation unit 15, the NW configuration display unit 16 adds a drawing object of a red line between points corresponding to TPE1 and TPE2 (S49o).

After S49n or S49o, the NW configuration display unit 16 retrieves a service subscriber information attribute value from the Entity DB 13 and displays the value in text (S49p).

Figure 48:
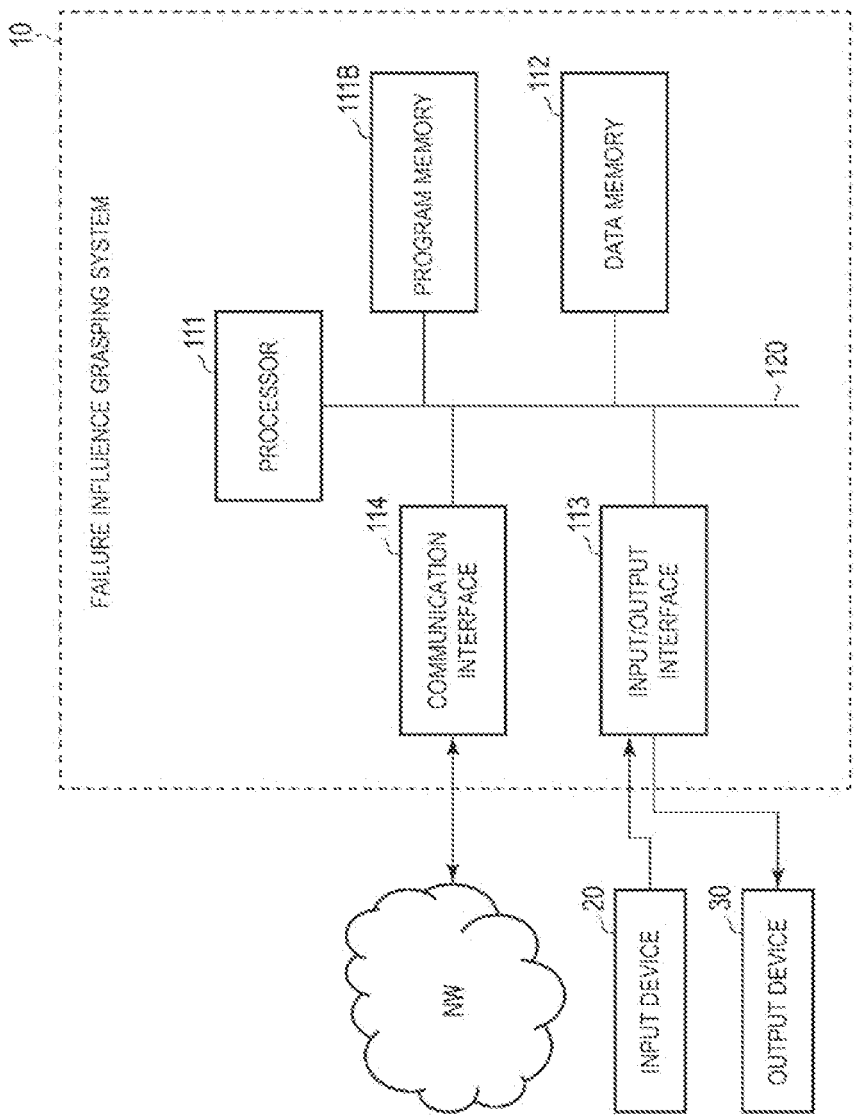
FIG. 48 is a block diagram illustrating an example of a hardware configuration of a failure influence grasping system according to an embodiment of the present invention.

FIG. 48 is a block diagram illustrating an example of a hardware configuration of a failure influence grasping system according to an embodiment of the present invention.

In the example illustrated in FIG. 48, the failure influence grasping system 10 according to the fifth to eighth embodiments described above is constituted by a server computer or a personal computer, for example, and has a hardware processor 111A such as a CPU. A program memory 111B, a data memory 112, an input/output interface 113, and a communication interface 114 are connected to the hardware processor 111A via a bus 120.

The communication interface 114 includes, for example, one or more wireless communication interface units to allow transmission/reception of information to/from a communication network NW. As the wireless interface, for example, an interface adopting a small power wireless data communication standard such as a wireless local area network (LAN) is used.

An input device 20 and an output device 30 for an operator, that are provided in the failure influence grasping system 10, are connected to the input/output interface 113.

The input/output interface 113 captures operation data input by an administrator through the input device 20 such as a keyboard, touch panel, touch pad, mouse, and the like, and outputs output data to the output device 30 including a display device in which a liquid crystal, an organic electro luminescence (EL), or the like is used to display the output data. Note that as the input device 20 and the output device 30, a device built into the failure influence grasping system 10 may be used, or an input device and an output device of another information terminal communicable via the network NW may be used.

The program memory 111B is a memory in which a non-volatile memory such as a hard disk drive (HDD) or a solid state drive (SSD) that can be written and read at any time and a non-volatile memory such as a read only memory (ROM) are used in combination as a non-transitory tangible storage medium, in which a program necessary to perform various types of control processing according to an embodiment is stored.

The data memory 112 is a memory in which, for example, the non-volatile memory described above and a volatile memory such as a random access memory (RAM) are used in combination as a tangible storage medium, and is used to store various data acquired and created in the course of performing information collection processing.

A failure influence grasping system 10 according to an embodiment of the present invention is configured as a data processing device including a facility information registration unit 11, a Spec DB 12, an Entity DB 13, a failure location Entity acquisition unit 14, an NW influence range computation unit 15, and an NW configuration display unit 16, illustrated in FIG. 33 and the like, as processing function units by software.

The Spec DB 12 and the Entity DB 13 can be constituted using a data memory 112 illustrated in FIG. 48. However, the Spec DB 12 and the Entity DB 13 are not essential components within the failure influence grasping system 10, but may be provided in an external storage medium such as a universal serial bus (USB) memory or a storage device such as a database server disposed on the cloud.

All the processing function units of the facility information registration unit 11, the failure location Entity acquisition unit 14, the NW influence range computation unit 15, and the NW configuration display unit 16 are implemented by causing the hardware processor 111A to read and execute a program stored in the program memory 111B. Note that some or all of these processing function units may be implemented by other various forms including an integrated circuit such as an application specific integrated circuit (ASIC) or a field-programmable gate array (FPGA).

Next, supplementary explanation on a display coordinate of an Entity will be made. The display coordinate of an Entity object has been described as the two-dimensional coordinate system, but the present invention is not limited thereto, and a coordinate axis can be designed with a Spec for each layer, and can be designed in a three-dimensional coordinate system.

This processing of designing the coordinate axis with Spec for each layer can be achieved by processing of adding a unique coordinate attribute in the SpecCharacteristic class of the Spec class and processing of adding an attribute name in the CharacteristicValue class of the Entity.

Next, effects achieved by an embodiment of the present invention will be described. In an embodiment of the present invention, a network management apparatus manages a device and a medium in a physical layer as a device object and a medium object, respectively, manages communication endpoints of a logical layer as point objects, manages communication connected between the point objects as a line or surface object, and manages overall communication between the logical layers as a communication object.

The point objects each have attributes that refer to the corresponding device and the medium object in the physical layer. In addition, the point objects each have an attribute that refers to a point object at a lower layer relative to the logical layer.

Setting a failure location is achieved by setting a value indicating a failure in attributes of the device and medium objects in the physical layer.

Searching for a failure influence range is achieved by searching for an object of the logical layer corresponding to the object set as the failure location by the network management apparatus, and searching for a line object, a surface object, and a communication object including the object by the network management apparatus.

The communication object in which a failure occurs stores information of service users that utilize communication of the logical layer.

As described above, in an embodiment of the present invention, the network management apparatus can identify the influence range in the logical layer used by the communication service and can grasp the information of the affected service users.

Further, a scheme described in each embodiment can be stored in a recording medium such as a magnetic disk (a Floppy (trade name) disk, a hard disk, or the like), an optical disc (a CD-ROM, a DVD, an MO, or the like), and a semiconductor memory (a ROM, a RAM, a flash memory, or the like), or transferred by a communication medium for distribution, as a program (a software unit) that can be executed by a computing device (a computer). Note that the program stored on the medium side includes a setting program for configuring, in a computing device, a software unit (including not only an execution program but also a table and a data structure) to be executed by the computing device. The computing device which realizes the present apparatus reads the program recorded in the recording medium, optionally builds the software unit by the setting program, and executes the above-described processing by controlling the operation with the software unit. Note that the recording medium referred to herein is not limited to a recording medium for distribution, but includes a storage medium such as a magnetic disk or a semiconductor memory provided in a computing machine or a device connected via a network.

It is to be noted that the present invention is not limited to the above embodiments and can be variously modified in the implementation stage without departing from the gist of the present invention. An appropriate combination of the embodiments can also be implemented, in which a combination of their effects can be obtained. Further, the above embodiments include various inventions, which can be designed by combining constituent elements selected from a plurality of constituent elements disclosed here. For example, a configuration in which some constituent elements are removed from all the constituent elements shown in the embodiments can be designed as an invention if the problems can be solved and the effects can be achieved.

REFERENCE SIGNS LIST

11 Facility information registration unit
12 Spec database (DB)
13 Entity DB

14 Failure location Entity acquisition unit
15 NW influence range computation unit
16 NW configuration display unit

The invention claimed is:

1. A network management apparatus comprising:
a storage unit configured to store information indicating a correspondence relationship between information objects related to a physical layer and information objects related to a logical layer in a network configuration, and stores information about subscribers to a service by the network configuration in association with the information objects related to the logical layer;
an acquisition unit configured to acquire a first information object related to a location where a failure occurs in the physical layer of the network configuration from the storage unit;
an identification unit configured to identify, as a failure influence range, a second information object associated with the first information object related to the location where the failure occurs, of the information objects related to the logical layer stored in the storage unit, the first information object being acquired by the acquisition unit; wherein the identification unit further identifies a piece of the information about the subscribers that is associated with the second information object as information of a subscriber affected by the failure; and
an outputting unit configured to output information indicating the failure influence range identified by the identification unit, the output information including the information of the subscribers affected by the failure.

2. The network management apparatus according to claim 1, wherein
the information objects related to the physical layer include a port object indicating a communication port attached to a communication device,
the information objects related to the logical layer include a plurality of point objects indicating a generating location or a termination of communication and a line or surface object including a point object of the plurality of point objects, and
the correspondence relationship between the information objects related to the physical layer and the information objects related to the logical layer includes a correspondence relationship between the port object and the point object.

3. The network management apparatus according to claim 2, wherein when the first information object related to the location where the failure occurs, acquired by the acquisition unit, is the port object, the identification unit identifies the port object as a failure influence range in the physical layer and identifies a point object associated with the identified port object and a line or surface object including the point object as a failure influence range in the logical layer.

4. The network management apparatus according to claim 2, wherein
the information objects related to the physical layer include a device object indicating a communication device having the communication port, and
the identification unit, when the first information object related to the location where the failure occurs, acquired by the acquisition unit is the device object, is the device object, identifies a communication device indicated by the device object and a port object indicating a communication port included in the communication device as a failure influence range in the physical layer, and identifies a point object associated with the identified port object and a line or surface object including the point object as a failure influence range in the logical layer.

5. The network management apparatus according to claim 2, wherein
the information objects related to the physical layer include a medium object indicating a communication cable connectable to the communication port; and
the identification unit, when the first information object related to the location where the failure occurs, acquired by the acquisition unit, is the medium object, identifies a communication cable indicated by the medium object and a port object indicating a communication port connectable to the communication cable as a failure influence range in the physical layer, and identifies a point object associated with the identified port object and a line or surface object including the point object as a failure influence range in the logical layer.

6. A network management method performed by a network management apparatus, the network management method comprising:
storing, in a storage unit, information indicating a correspondence relationship between information objects related to a physical layer and information objects related to a logical layer in a network configuration and storing information about subscribers to a service by the network configuration in association with the information objects related to the logical layer;
acquiring a first information object related to a location where a failure occurs in the physical layer in the network configuration from the storage unit;
identifying, as a failure influence range, a second information object associated with the acquired first information object related to the location where the failure occurs, among the information objects related to the logical layer stored in the storage unit;
identifying a piece of the information about the subscribers that is associated with the second information object as information of a subscriber affected by the failure and
outputting information indicating the identified failure influence range, including the information of the subscribers affected by the failure.

7. A non-transitory computer-readable storage medium that stores a network management processing program for causing a processor to function as each of the units of the network management apparatus described in claim 1.

8. The network management apparatus according to claim 1 wherein the information about the subscribers is defined as uniform resource locator.

* * * * *